United States Patent [19]

Eguchi et al.

[11] Patent Number: 4,734,338
[45] Date of Patent: Mar. 29, 1988

[54] ELECTROLUMINESCENT DEVICE

[75] Inventors: Ken Eguchi, Yokohama; Haruki Kawada, Kawasaki; Yukuo Nishimura, Sagamihara, all of Japan

[73] Assignee: Canon Kabushiki Kaisha, Tokyo, Japan

[21] Appl. No.: 20,172

[22] Filed: Feb. 27, 1987

Related U.S. Application Data

[63] Continuation of Ser. No. 760,355, Jul. 29, 1985, abandoned.

[30] Foreign Application Priority Data

| Jul. 31, 1984 | [JP] | Japan | 59-158809 |
| Jul. 31, 1984 | [JP] | Japan | 59-158810 |
| Jul. 31, 1984 | [JP] | Japan | 59-158811 |
| Jul. 31, 1984 | [JP] | Japan | 59-158812 |
| Jul. 31, 1984 | [JP] | Japan | 59-158813 |
| Jul. 31, 1984 | [JP] | Japan | 59-158814 |
| Jul. 31, 1984 | [JP] | Japan | 59-158815 |
| Jul. 31, 1984 | [JP] | Japan | 59-158817 |
| Jul. 31, 1984 | [JP] | Japan | 59-158818 |
| Jul. 31, 1984 | [JP] | Japan | 59-158819 |
| Jul. 31, 1984 | [JP] | Japan | 59-158820 |
| Jul. 31, 1984 | [JP] | Japan | 59-158821 |
| Jul. 31, 1984 | [JP] | Japan | 59-158822 |
| Jul. 31, 1984 | [JP] | Japan | 59-158823 |

[51] Int. Cl.$^4$ ................................................. H01J 1/62
[52] U.S. Cl. .................................. 428/690; 428/691; 428/917; 313/503; 313/505
[58] Field of Search ............... 313/503, 505; 428/690, 428/691, 917

[56] References Cited

U.S. PATENT DOCUMENTS

| 3,172,802 | 3/1965 | Gurnee et al. | 252/301.3 |
| 3,173,050 | 3/1965 | Gurnee | 313/504 |
| 3,359,445 | 12/1967 | Roth | 313/503 |
| 3,382,394 | 5/1968 | Mehl | 313/504 |
| 3,621,321 | 11/1971 | Williams et al. | 313/504 |
| 3,710,167 | 1/1973 | Dresner et al. | 313/504 |
| 3,995,299 | 11/1976 | Partridge | 313/504 X |
| 4,356,429 | 10/1982 | Tang | 313/503 |
| 4,539,507 | 9/1985 | Van Slyke et al. | 313/504 |
| 4,542,712 | 9/1985 | Sato et al. | 118/726 |

FOREIGN PATENT DOCUMENTS 0125278  11/1978  Japan .................................. 428/917

OTHER PUBLICATIONS

Engler, et al. "New Electrochemical Flouresant Display Material with Memory", IBM Technical Disclosure Bulletin, Jul. 22, 1978.

Allan, "Atoms Add Luster to Electroluminescence" *Electronics* Review, 53, pp. 42–44, May 22, 1980.

*Primary Examiner*—Nancy A. B. Swisher
*Attorney, Agent, or Firm*—Fitzpatrick, Cella, Harper & Scinto

[57] ABSTRACT

An electroluminescent device comprises a luminescent layer and a pair of electrodes between which the luminescent layer is sandwiched, said luminescent layer comprising one layer comprising a relatively electron-acceptable organic compound and a compound capable of being an electron-donor or electron-acceptor to said compound, another layer comprising a relatively electron-donative organic compound and a compound capable of being an electron-acceptor or electron-donor to said compound, and still another layer having electrical insulating property, said three layers being repeatedly accumulated, and at least one of the three layers having a monomolecular film or a monomolecular layer built-up film.

56 Claims, 7 Drawing Figures

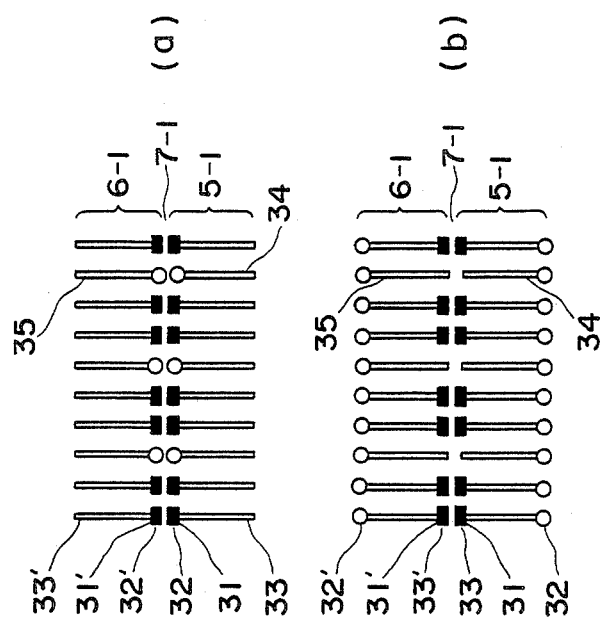
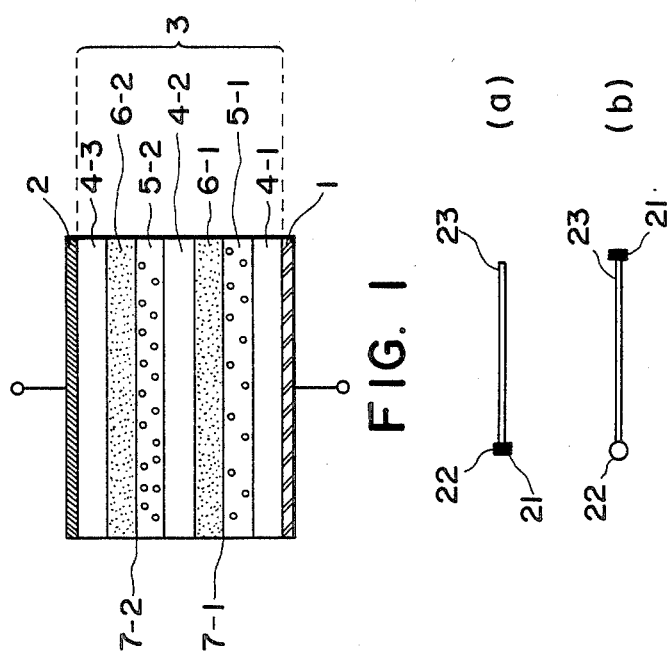
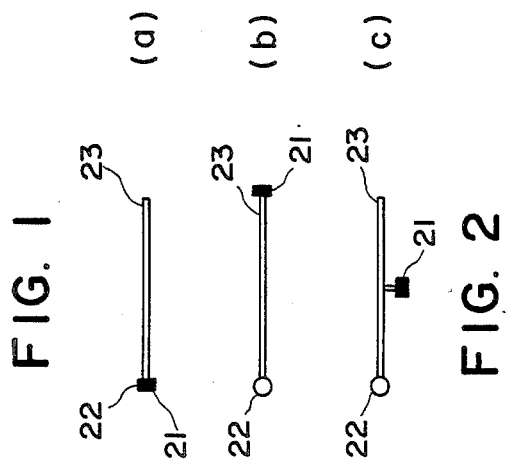
FIG. 1
FIG. 2
FIG. 3a

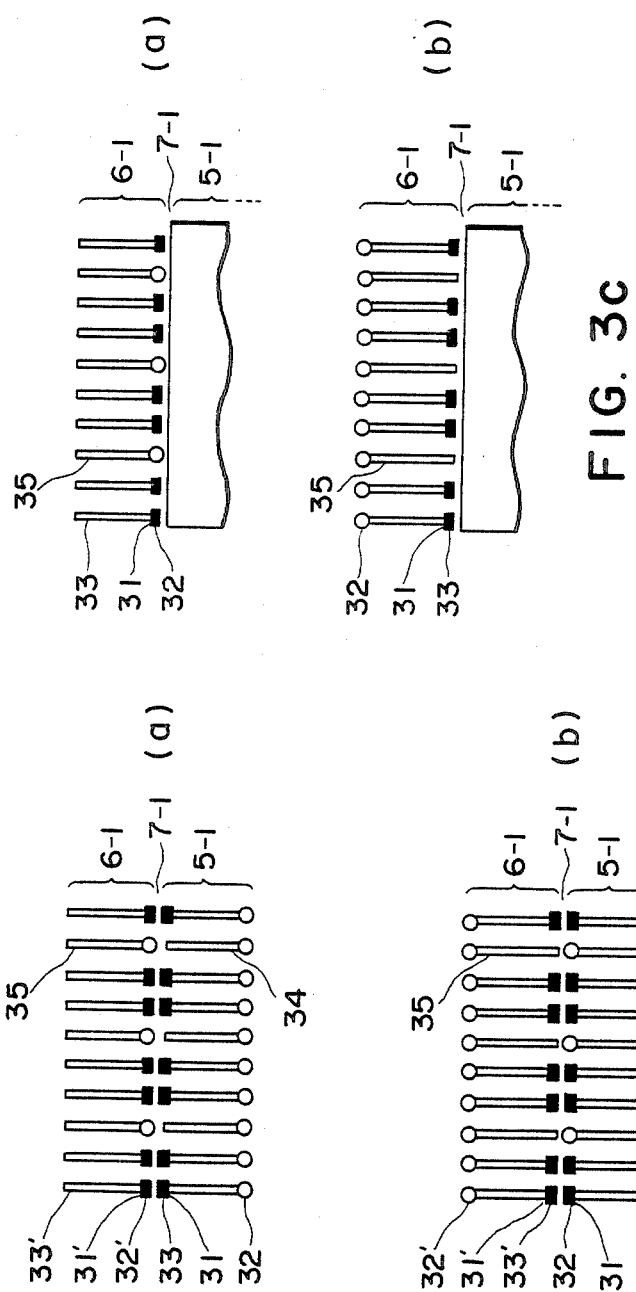

ELECTROLUMINESCENT DEVICE

This application is a continuation of application Ser. No. 760,355, filed July 29, 1985, now abandoned.

BACKGROUND OF THE INVENTION

1. Field of the Invention

This invention relates to an electroluminescent device (hereinafter referred to as "EL-device") and, more particularly, to an EL-device comprising a layer having an electroluminescent function (hereinafter referred to as "EL-function") constituted of a combination of two types of thin films composed of organic compounds having electrochemical characteristics different from each other.

2. Description of the Prior Art

An EL-device is constituted of a luminescent layer composed of a material having EL-function, that is, a material capable of emitting light when placed in an electric field, sandwiched between two electrodes, and is a luminescent device which can convert electric energy directly into light when a voltage is applied across the electrodes. The EL-device is different from conventional luminescent systems such as an incandescent lamp which emits light by making a filament incandescent, a fluorescent lamp where a gas excited electrically imparts an energy to a fluorescent substance to emit light, and the like. Therefore, EL-devices can be expected to be used as constitution materials for lamps and display mediums used for displaying lines, figures, images and the like of various shapes such as thin panel, belt, cylinder and the like, or further, a luminescent body of a large area such as panel lamps and the like. These points of EL-device draw attention.

Depending on the luminescent mechanism, EL-devices are generally classified into two classes, i.e. an intrinsic EL system where an electric field excited luminescence is conducted accompanied by movement of carrier in the luminescent layer and a carrier injection EL system where an electric field excited luminescence is carried out by injecting carriers into a luminescent layer.

In addition, EL-devices may be classified into other two classes, depending on the structure of the luminescent layer, i.e. a thin film type having a thin film composed of a material of EL function as a luminescent layer and a powder type having a luminescent layer composed of a material of EL function dispersed in a binder.

As the material of EL function, there have been heretofore inorganic metal materials such as ZnS containing Mn, Cu, ReF₃ and (Re: rare earths) or the like as an activating agent, and the like.

In the case of a thin film type EL device, the structure is suitable for the following purposes, that is, a thin luminescent layer can be formed so as to sufficiently shorten the distance between the electrodes and a strong electric field can be formed in the luminescent layer so as to produce a good luminescence of high luminance even by a low voltage driving. However, where the above-mentioned inorganic metal material such as ZnS is used to form a thin film type luminescent layer by a thin film forming method such as vapor deposition and the like and a thin film type EL device is fabricated, the manufacturing cost is very high and, in addition, it is very difficult to form a luminescent layer composed of a uniform thin film of a large area and therefore, it is not possible to produce EL-devices of good quality and large area by mass production.

On the contrary, as an EL-device which is suitable for mass production and is inexpensive, there are known organic powder type EL-devices of an intrinsic EL system where the above-mentioned EL intrinsic material, mainly compound of ZnS, is dispersed in an organic binder to form a luminescent layer.

However, in the powder type EL-device, when the luminescent layer is made thin, defects such as pinhole and the like are liable to be formed in the luminescent layer. Thus, in view of the limitation due to the structure, it is difficult to make the luminescent layer thinner than a certain thickness for enhancing sufficiently the luminescent characteristics, and therefore sufficient luminescence, in particular, a high luminance, can not be obtained. Further, since the thickness of the luminescent layer becomes relatively thick, power consumption is disadvantageously large for generating a strong electric field.

For the purpose of generating a stronger electric field in the luminescent layer of the powder type EL-device, Japanese Patent Application Laid-open No. 172891/1983 discloses an improved EL-device comprising an intermediate dielectric layer composed of a polymer of vinylidene fluoride in a luminescent layer of powder type.

However, satisfactory luminance and desirably low power consumption have not been achieved.

On the contrary, in place of conventional metallic or inorganic materials, it has been recently contemplated to employ organic compound materials which can be formed into a thin film of high precision by utilizing various thin film forming methods, and control their chemical structures and high order structures to use them as optical and electronics materials in a form of electrochromic device, piezoelectric device, pyroelectric device, nonlinear optical device, ferroelectric liquid crystal or the like. In addition, it is also expected to use such organic materials as a material for constituting a luminescent layer for EL-devices.

Among them, an organic materials for a luminescent layer of EL-devies, there are known anthracene, pyrene, perylene, their derivatives and the like. Japanese Patent Application Laid-open No. 35587/1977 discloses an EL-device of carrier injection type where a monomolecular layer built-up film of the above-mentioned materials is used as a luminescent layer.

However, in this EL-device though the luminescent layer is formed by a thin film of high precision, the density of carriers, that is, electrons and holes, is so small that the excitation probability of the functional molecules due to movement and recombination of carriers is low and thereby, an efficient luminescence can not be produced, and, in particular, the power consumption and luminance are not yet satisfactory.

SUMMARY OF THE INVENTION

An object of the present invention is to provide an EL-device free from the above-mentioned drawbacks.

Another object of the present invention is to provide an EL-device of good luminescent efficiency, capable of giving a sufficiently high luminance even by a low voltage drive, of low cost and having a structure which can be easily fabricated.

A further object of the present invention is to provide an EL-device having a structure which can be formed by appropriately selecting a material from various organic compound materials for EL-devices and using an optimal thin film producing method for the selected material and to which desirable luminescent characteristics can be easily imparted.

According to one aspect of the present invention, there is provided an electroluminescent device which comprises a luminescent layer and a pair of electrodes between which the luminescent layer is sandwiched, said luminescent layer comprising a first layer comprising a relatively electron-acceptable organic compound and a compound capable of being an electron-donor to said compound, a second layer comprising a relatively electron-donative organic compound and a compound capable of being an electron-acceptor to said compound, and a third layer having electrical insulating property, said three layers being repeatedly accumulated at least twice, and at least one of the three layers having a monomolecular film or a monomolecular layer built-up film.

According to another aspect of the present invention, there is provided an electroluminescent device which comprises a luminescent layer and a pair of electrodes between which the luminescent layer is sandwiched, said luminescent layer comprising a first layer comprising a relatively electron-acceptable organic compound and a compound capable of being an electron-donor to said compound, a second layer comprising a relatively electron-donative organic compound and a compound capable being an electron-acceptor to said compound, these layers being arranged such that, in the direction of from one electrode to the other electrode, on the third layer there are successively overlaid the first layer, the second layer and another third layer in the mentioned order and this three-layer set is accumulated at least twice, and at least one of the three layers having a monomolecular film or a monomolecular layer built-up film.

According to a further aspect of the present invention, there is provided an electroluminescent device which comprises a luminescent layer and a pair of electrodes between which the luminescent layer is sandwiched, said luminescent layer comprising a first layer comprising a relatively electron-acceptable organic compound and a compound capable of being an electron-acceptor to said compound, a second layer comprising a relatively electron-donative organic compound and a compound capable of being an electron-donor to said compound, and a third layer having electrical insulating property, said three layers being repeatedly accumulated at least twice, and at least one of the three layers having a monomolecular film or a monomolecular layer built-up film.

According to still another aspect of the present invention, there is provided an electroluminescent device which comprises a luminescent layer and a pair of electrodes between which the luminescent layer is sandwiched, said luminescent layer comprising a first layer comprising a relatively electron-acceptable organic compound and a compound capable of being an electron-acceptor to said compound, a second layer comprising a relatively electron-donative organic compound and a compound capable being an electron-donor to said compound, these layers being arranged such that, in the direction of from one electrode to the other electrode, on the third layer there are successively overlaid the first layer, the second layer and another third layer in the mentioned order and this three-layer set is accumulated at least twice, and at least one of the three layers having a monomolecular film or a monomolecular layer built-up film.

BRIEF DESCRIPTION OF THE DRAWINGS

FIG. 1 is a schematic cross sectional view of an embodiment of the EL-device according to the present invention;

FIG. 2 schematically shows molecular structures of compounds for forming monomolecular films;

FIGS. 3a, 3b, 3c and 3d schematically show representative examples of arrangements of molecules at the interface between a first layer and a second layer in EL-devices of the present invention; and FIG. 4 is a schematic cross sectional view of an EL cell in which an EL-device of the present invention is built in.

DESCRIPTION OF THE PREFERRED EMBODIMENTS

Figure 4:
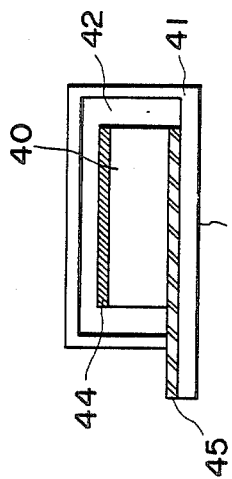

The EL-device of the present invention is a thin film type EL-device of so-called intrinsic EL system comprising a luminescent layer having EL function with an intervening insulating layer, sandwiched between a pair of electrodes. The feature of the present invention resides in the structure of the luminescent layer. At least one electrode of the pair of electrodes may be transparent.

The luminescent layer of EL-device according to the present invention has a structure that a relatively electron-acceptable organic compound (hereinafter referred to as "EA compound") and a relatively electron-donative organic compound (hereinafter referred to as "ED compound") are contacted with each other. Further, in the luminescent layer of the present invention, a compound which may be an electron donor (EA-d compound)(or an electron acceptor (EA-a compound)) relative to the EA compound is contained in the vicinity of the EA compound, and a compound which may be an electron acceptor (EA-a compound)(or an electron donor (EA-d compound)) relative to the ED compound is contained in the vicinity of the ED compound. When these compounds are placed in an electric field, acceptance and donation of electrons between the ED compound and the EA compound occur and an excited complex is formed resulting in emitting light. This luminescence is used as a main luminescent source.

The structure of the EL-device of the present invention is suitable for producing efficiently such an excited complex as the electric field is generated.

Referring to the drawing the EL-device of the present invention will be explained more in detail below.

The like numerals in the drawing indicate the like portions.

FIG. 1 is a schematical cross sectional view of an embodiment of the EL-device of the present invention.

1 and 2 are electrodes applying voltage to the luminescent layer so as to generate an electric field. 1 is a transparent electrode to take out generated light. 3 is a luminescent layer having EL function and is a multi-layered structure, that is, at the both ends are provided third layers 4-1 and 4-3 which are insulating layers, and between the third layers are laminated alternatively first layers 5-1 and 5-2, second layers 6-1 and 6-2, and a third layer 4-2.

The first layer (5-1 and 5-2), the second layer (6-1 and 6-2) and the third layer (at least one of 4-1, 4-2 and 4-3) are a monomolecular film or a monomolecular built up film composed of a compound which can form these layers.

In luminescent layer 3, a first layer 5-1 contains a compound as a main constituent which can be an EA compound relative to an ED compound contained in a second layer 6-1, and the second layer 6-1 directly contacting a first layer 5-1 contains a compound as a main constituent which can be an ED compound relative to an EA compound contained in the first layer 5-1. The interface 7-1 between the first layer 5-1 and the second layer 6-1 is a contacting surface between an EA compound and an ED compound. The relation between the first layer 5-2 and the second layer 6-2 is similar to that as mentioned above, and an interface 7-2 is independently formed by these layers.

When a voltage is applied across luminescent layer 3 through electrodes 1 and 2, the EA compound and the ED compound form a complex in an excited state at interfaces 7-1 and 7-2, and when the excited complex returns to the ground state, the excitation energy is emitted in the form of light from the excited complex, EA compound and/or ED compound. As mentioned above, the luminescence in the EL-device of the present invention is mainly based on luminescence at the interfaces 7-1 and 7-2.

The EA-d compound which can be an electron donor (or the EA-a compound which can be an electron acceptor) relative to the EA compound as a main constituent as contained in the first layers 5-1 and 5-2. This EA-d compound (or EA-a compound) has mainly a function for raising the electric field excitation efficiency of the EA compound by the interaction between the EA compound and the EA-d compound (or EA-a compound), that is, donation (or acceptance) of the electron relative to the EA compound.

The ED-a compound which can be an electron acceptor (or the ED-d compound which can be an electron donor) relative to the ED compound as a main constituent is contained in the second layers 6-1 and 6-2. This ED-a compound (or ED-d compound) has mainly a function of rising the electric field excitation efficiency of the ED compound by the interaction between the ED compound and the ED-a compound (or the ED-d compound), that is, acceptance (or donation) of the electron relative to the ED compound.

The ED-a (or ED-d) and EA-d (or EA-a) compounds may have, in addition to the above function, function for controlling the electrochemical property of the first layer and the second layer as desired. The function for controlling coloring is mentioned as an example.

First layers 5-1 and 5-2, and second layers 6-1 and 6-2 may be independently constituted of monomolecular films or monomolecular layer built-up films composed of molecules of compounds as a main constituent directly participating in the formation of electric field excited complexes or molecules of compounds as a main constituent having at least one of the above-mentioned molecules of compounds as a functional moiety as shown below. However, the first layer, second layer and third layer are not simultaneously composed of materials other than monomolecular films and monomolecular layer built-up films.

Further, in the first layers 5-1 and 5-2, the EA-d compound which can be an electron donor (or the EA-a compound which can be an electron acceptor) relative to the EA compound as main constituent is contained as a subconstituent. And, in the second layers 6-1 and 6-2, the ED-a compound which can be an electron acceptor (or the ED-d compound which can be an electron donor) relative to the ED compound as a main constituent is contained as a subconstituent.

Representative arrangements in luminescent layer 3 of molecules of compounds directly participating in the formation of electric field excited complexes, and contained as a main constituent in the first layer and the second layer are as shown below.

(a) First layers 5-1, 5-2 and second layers 6-1, 6-2, contain respective molecules of compounds having EL function based on the formation of excited complexes (mainly luminescence).

(b) First layers 5-1 and 5-2 contain molecules of compound having EL function based on the formation of excited complexes, and second layers 6-1 and 6-2 contain respective molecules of compounds which can be electron donors relative to the compounds in the respective first layers (ED compound)

(c) Second layers 6-1 and 6-2 contain molecules of compounds having EL function based on the formation of excited complexes and first layers 5-1 and 5-2 contain respective molecules of compounds which can be electron acceptors relative to the compounds in the respective second layer (EA compound).

As the compounds having EL function based on the formation of the excited complex, there are preferably used organic compounds having a high luminescent quantum efficiency and $\pi$ electron system susceptible to external perturbation and capable of being excited readily by electric field.

As such compounds, there may be mentioned, for example, fused polycyclic aromatic hydrocarbons, p-terphenyl, 2,5-diphenyloxazole, 1,4-bis(2-methylstyryl)-benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, compounds having EL function based on the formation of excited complex selected from heterocyclic compounds other than those mentioned above, derivatives thereof, aromatic amines, aromatic polyamines, and compounds having a quinone structure.

From these compounds, one or more compounds which can be relatively EA compounds and one or more compounds which can be relatively ED compounds may be appropriately selected and combined to form a luminescent layer of the structure (a) comprising first layers and second layers. When the layers are in a form of a monomolecular film or a monomolecular layer built-up film, a monomolecular layer building up method (infra) may be used.

When the layers are constituted in a way different from those as mentioned above, there may be produced, for example, by a thin film forming method such as vapor deposition, CVD and the like.

In addition, as the compounds which can be electron acceptors or electron donors relative to the above-mentioned compounds having EL function based on the formation of excited complexes, there may be mentioned heterocyclic compounds other than those mentioned above, derivatives thereof, aromatic amines, aromatic polyamines, compounds having a quinone structure, tetracyanoquinodimethane, tetracyanoethylene and the like.

By combining the previously mentioned compounds with the above-mentioned compounds accordingly, there can be formed the luminescent layer having the structure (b) or (c) of the first layers and the second layers.

Further, EA-d compound contained in the first layer which can be an electron-donor relative to EA compound as a main constituent of the first layer (or EA-a compound which can be an electron-acceptor) and ED-a compound contained in the second layer which can be an electron-acceptor relative to ED compound as a main constituent of the second layer (or ED-d compound which can be an electron-donor) are exemplified by the following compounds: a compound having EL function based on the aforesaid formation of excited complexes (mainly, a light-emitting compound); a compound being able to be an electron-donor or electron-acceptor relative to said compound; a compound being able to emit light through excited-energy transferring; and, a compound having at least one of the above compounds as a functional portion in itself. In formation of the first layer and the second layer, these EA-d (or EA-a) and ED-a (or ED-d) compounds can suitably be selected from the above-mentioned compounds and used, so that they have any function as above in accordance with compounds used as a main constituent of the first layer and the second layer. Amounts of EA-d (or EA-a) compound to EA compound and ED-a (or ED-d) compound to ED compound vary depending on compounds used for the first layer and the second layer, and hence these amounts can not be defined absolutely.

However, EA-d (or EA-a) compound, in general, can range from about 10 mol % to about 0.1 mol % to EA compound, ED-a (or ED-d) compound can also range from about 10 mol % to about 0.1 mol % to ED compound.

Further, a compound which can be an ED or an EA compound as mentioned above can be a compound having light-emitting function not based on the formation of excited complexes, furthermore it can be an EA-d (or EA-a) compound and an ED-a (or ED-d) compound, and can be a compound having EL function. Electroluminescence of the present invention is not limited to that at interfaces 7-1 and 7-2 between the first layer and the second layer but can contain the case of electroluminescence occurring at the first layers 5-1 and 5-2 and the second layers 6-1 and 6-2.

The first layers 5-1 and 5-2 and the second layers 6-1 and 6-2 comprising a monomolecular film or a monomolecular layer built-up film constituted as mentioned above are preferably formed according to the so-called monomolecular layer built-up method capable of making molecular orientations and arrangements high-ordered and forming a super-thin film easily.

This monomolecular built-up method is based on the following principle. That is, for example, in molecules with a structure having a hydrophilic group and a hydrophobic group in the molecule, when the balance between the both groups (amphiphilic balance) is adequately maintained, a large number of such molecules will form a layer of monomolecules with the hydrophilic group pending downward on the water surface. The monomolecular layer on the water surfaces has the characteristics of a two-dimensional system. When the molecules are spread sparsely, between the area per one molecule and the surface pressure $\pi$, the formula of the two-dimensional ideal gas:

$$\pi A = kT$$

is valid (where k is the Boltzman's constant and T is the absolute temperature). While these molecules form a "gaseous film", if A is made sufficiently small, the interaction between the molecules will be strengthened to make the film a "condensed film (or solid film)". The condensed film can be transferred onto the surface of a substrate such as glass, etc., and a ultra-thin monomolecular film or its built-up film can be formed on the substrate.

According to this method, the directions in which the molecules for forming the monomolecular film may be made uniform within one monomolecular film, as exemplified by a high ordered orientation of substantially all the hydrophilic moieties of the constituent molecules toward the substrate side. Accordingly, by forming the interface between the first layer and/or the second layer in the EL device of the present invention using a monomolecular film or a monomolecular layer built-up film, it is rendered possible to arrange the functional moieties comprising compound molecules participating directly in formation of excited complexes contained in the layer formed as the monomolecular film or the monomolecular layer built-up film at a high density at the interface between the first layer and the second layer.

As the solution for formation of monomolecules in the monomolecular built-up method, various solutions may be available, and depending on the solution employed, compounds for formation of monomolecular film having well-balanced moieties different in affinity for said solution can be selected appropriately to form monomolecular films. Among such solutions for formation of monomolecular films, water and aqueous solutions composed mainly of water may preferably be used in view of its low cost, easiness in handling as well as safety.

Referring now to an example in which the monomolecular built-up method using water or a solution mainly composed of water is applied, the constitution of the luminescent layer in the EL device of the present invention is described.

Basically, the compound capable of forming the first layer and the second layer possessed by the luminescent layer in the EL device of the present invention is the ED, EA, ED-a (or ED-d) and EA-d (or EA-a) compounds, or a compound having at least one of the compounds as functional moiety. Of these compounds, those capable of forming a monomolecular film, when taking an example of the compounds having one functional moiety, may be classified broadly into the three types depending on the position having the functional moiety in the molecule, as shown in the schematic illustration of the molecular structure shown in FIG. 2 namely:

(a) the functional moiety 21 exists on the hydrophilic portion 22 side—FIG. 2(a);

(b) the functional moiety 21 exists on the hydrophobic portion 23 side—FIG. 2(b); and (c) the functional moiety 21 exists at approximately the middle between the hydrophobic portion 23 and the hydrophilic portion 22—FIG. 2(c).

As the constituent element of the hydrophilic portion 22 of these compounds, there may be included, for example, carboxyl group and its metal salt, amine salt and ester, sulfonic acid group and its metal salt and amine salt, sulfonamide group, amide group, amino group, imino group, hydroxyl group, quaternary amino group, oxyamino group, oxyimino group, diazonium group, guanidine group, hydrazine group, phosphoric acid group, silicic acid group, aluminic acid group, etc., and each or a combination of these groups can constitute the hydrophilic portion 22 in the above compound.

On the other hand, the constituent element of the hydrophobic portion 23 may include groups exhibiting hydrophobic property such as straight or branched alkyl group, olefinic hydrocarbon such as vinylene, vinylidene, acetylene, etc., phenyl, fused polycyclic phenyl such as naphthyl, anthranyl, etc., chain polycyclic phenyl such as biphenyl, etc., and each or a combination of these groups can constitute the hydrophobic portion 23 in the above compound.

On the other hand, the orientation and arrangement of the ED compound and the EA compound contained in the monomolecular films at the interfaces 7-1, 7-2 (the portion where luminescence is effected primarily) between the first layer and the second layer of the luminescent layer in the EL device of the present invention may be classified basically according to the following four patterns, as shown in the schematic sectional partial view around the interface 7-1 in FIGS. 3a and 3b (in the case of these Figures, both the first layer and the second layer are formed of a monomolecular film consisting of the compound having one functional moiety composed of the ED or EA compounds, and as to the molecules having the functional moieties composed of the ED-a compound (or the ED-d compound) 35 and the EA-d compound (or the EA-a compound) 34, the above functional moieties are not shown in the figures):

(1) the hydrophilic portion 32 having the functional moiety 31 (composed of the EA compound) of a molecule for forming a monomolecular film of the first layer 5-1 and the hydrophilic portion 32' having the functional moiety 31' (composed of the ED compound) of a molecule for forming a monomolecular film of the second layer 6-1 are oriented on the interface 7-1—FIG. 3a(a);

(2) the hydrophobic portion 33 having the functional group 31 (composed of the EA compound) of a molecule for formation of a monomolecular film of the first layer 5-1 and the hydrophobic portion 33' having the functional moiety 31' (composed of the ED compound) of a molecule for formation of a monomolecular film of the second layer 6-1 are oriented on the interface 7-1—FIG. 3a(b);

(3) the hydrophobic portion 33 having the functional moiety 31 (composed of the EA compound) of a molecule for forming a monomolecular film of the first layer 5-1 and the hydrophilic portion 32' having the functional moiety 31' (composed of the ED compound) of a molecule for forming a monomolecular film of the second layer 6-1 are oriented on the interface 7-1—FIG. 3b(a);

(4) the hydrophilic portion 32 having the functional moiety 31 (composed of the EA compound) of a molecule for formation of a monomolecular film of the first layer 5-1 and the hydrophobic portion 33' having the functional moiety 31' (composed of the ED compound) of a molecule for formation of a monomolecular film 6-1 of the second layer are oriented on the interface 7-1—FIG. 3b(b).

For forming such patterns of interface in a luminescent layer, the above-mentioned compounds for formation of a monomolecular film containing the EA or ED compound as a functional moiety belonging to type a and type b are preferably used. For forming the pattern of interface (1), compounds belonging to the type a are preferably used for the first layer and the second layer; for forming the pattern of interface (2), compounds belonging to the type b are preferably used for the first layer and the second layer. Further, for forming the pattern of interface (3), a compound of the type a and a compound of the type b are preferably used for the first layer and the second layer, respectively. For forming the pattern of interface (4), a compound of type b and a compound of type a are preferably used for the first layer and the second layer, respectively.

The compound having a functional moiety composed of the ED-a compound (or the ED-d compound) 35 or the EA-d compound (or the EA-a compound) 34 not shown in the figure may be optionally selected from the types a–c of the compounds for forming the monomolecular film depending on the ED compounds or the EA compounds used for forming the interface patterns (1)–(4).

In the above-mentioned examples, the first layer and the second layer are composed of respective monomolecular films, but a similar procedure can be used even when the first layers 5-1 and 5-2 and/or the second layers 6-1 and 6-2 are composed of monomolecular layer built-up films, that is, monomolecular films constituting interfaces between the first layer and the second layer, 7-1 and 7-2, are formed so as to give the above mentioned pattern to the interface between the first and the second layers.

In an other case, in FIG. 3c, the orientation and arrangement of the ED compound contained in the monomolecular films at the interfaces 7-1 and 7-2 (the portions where luminescence occurs mainly) between the first layer and the second layer of the luminescent layer in the EL device of the present invention may be classified basically into the following two patterns, as shown in the schematic sectional partial view around the interface 7-1 in FIG. 3c (in these figures, the second layer is constituted of a monomolecular film composed of a compound having one functional moiety composed of the ED compound, and as to the molecules having the functional moieties composed of the ED-a compound (or the ED-d compound) 35, the above functional moieties are not shown in the figures.):

(1) the hydrophilic portion 32 having the functional moiety 31 (composed of the ED compound) of a molecule for forming a monomolecular film of the second layer 6-1 is oriented on the interface 7-1—FIG. 3c(a);

(2) the hydrophobic portion 33 having the functional moiety 31 (composed of the ED compound) of a molecule for forming a monomolecular film of the second layer 6-1 is oriented on the interface 7-1—FIG. 3c(b).

For forming the pattern of interface in the luminescent layer, there are preferably used compounds belonging to the type a and the type b compounds for forming the monomolecular film containing the ED compound as a functional moiety. Further, for forming the pattern of interface (1), the second layer is preferably formed by using a compound of the type a, and for forming the pattern of interface (2), the second layer is preferably formed by using a compound of the type b.

The compound having a functional moiety composed of the ED-a compound (or the ED-d compound) 35 not shown in the figure may be optionally selected from the types a–c of the compounds for forming the monomolecular film depending on the ED compounds or the EA compounds used for forming the interface patterns (1)–(2).

In the above-mentioned examples, the second layer is composed of a monomolecular film, but a similar procedure can be used even when the second layers 6-1 and 6-2 are composed of monomolecular layer built-up films, that is, monomolecular films of the second layer constituting the interfaces of the first layer and the second layer, 7-1 and 7-2, are formed so as to have the above-mentioned pattern of interface between the first layer and the second layer.

Figure 3D:
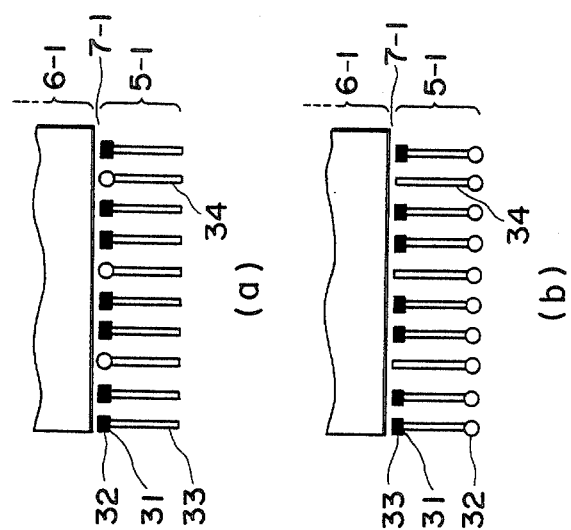

In a further case, in FIG. 3d, the orientation and arrangement of the EA compound contained in the monomolecular films at the interfaces 7-1 and 7-2 (the portions where luminescence occurs mainly) between the first layer and the second layer of the luminescent layer in the EL device of the present invention may be classified basically into the following two patterns, as shown in the schematic sectional partial view around the interface 7-1 in FIG. 3d (in these figures, the first layer is constituted of a monomolecular film composed of a compound having one functional moiety composed of the EA compound, and as to the molecules having the functional moieties composed of the EA-d compound (or the Ea-a compound) 34, the above functional moieties are not shown in the figures).

(1) the hydrophilic portion 32 having the functional moiety 31 (composed of the EA compound) of a molecule for forming a monomolecular film of the first layer 5-1 is oriented on the interface 7-1—FIG. 3d(a);

(2) the hydrophobic portion 33 having the functional moiety 31 (composed of the EA compound) of a molecule for forming a monomolecular film of the first layer 5-1 is oriented on the interface 7-1—FIG. 3d(b).

For forming the pattern of interface in the luminescent layer, there are preferably used compounds belonging to the type a and the type b compounds for forming the monomolecular film containing the EA compound as a functional moiety. Further, for forming the pattern of interface (1), the first layer is preferably formed by using a compound of the type a and for forming the pattern of interface (2), the first layer is preferably formed by using a compound of the type b.

The compound having a functional moiety composed of the EA-d compound (or the EA-a compound) 34 not shown in the figure may be optionally selected from the types a–c of the compounds for forming the monomolecular film depending on the ED compounds or the EA compounds used for forming the interface patterns (1)–(2).

In the above-mentioned examples, the first layer is composed of a monomolecular film, but a similar procedure can be used even when the first layers 5-1 and 5-2 are composed of monomolecular layer built-up films, that is, monomolecular films of the first layer constituting the interfaces of the first layer and the second layer, 7-1 and 7-2, are formed so as to have the above-mentioned pattern of interface between the first layer and the second layer.

When in FIG. 1 the first layers 5-1, 5-2 and/or the second layers 6-1, 6-2 are composed of monomolecular layer built-up films, respective monomolecular films constituting the built-up films may be the same or one or more monomolecular films may be different from other monomolecular films. Further, the structure depending on the oriented state of the molecules forming the respective monomolecular films of the monomolecular layer built-up films may be made variously, for example, the so-called Y type (the structure in which the hydophilic portions are faced to hydrophilic portions, or hydrophilic portions to hydrophilic portions between respective films), X type (the structure in which the hydrophobic portions are faced toward the substrate side of respective films), Z type (the structure in which the hydrophilic portions are faced toward the substrate side of respective films) and modified structure of these.

The monomolecular film constituting the first layer in the luminescent layer in the EL device of the present invention may be a multiconstituent type monomolecular film containing one or more of compounds in which the EA compound as a main constituent is formed as the functional moiety, and one or more kind of other compounds other than the "one or more kind of compounds in which EA-d compound (or the EA-a compound) as a subconstituent is formed as the functional moiety". The constitution of the second layer is the same as the above. In such a case, as the above other compounds, there may be mentioned compounds having no functional portion and capable of controlling the electrochemical characteristics of the luminescent layer by the interaction with the compounds having the functional portion, and further, compounds capable of increasing the strength of the layer and improving adhesion to other layers.

Such a structure of a monomolecular film or a monomolecular layer built-up film can be adequately chosen depending on the electrical characteristics of the first layer and the second layer, namely the compound or a combination of compounds forming the first layer or the second layer. For example, the potential curve of $\pi$ electrons in the direction perpendicular to the monomolecular film plane can be controlled by building up monomolecular films of a combination of the compounds belonging to the type a, b or c of the compounds for formation of monomolecular films as mentioned above.

As the compounds for forming the above-mentioned first layers 5-1, 5-2 and second layers 6-1, 6-2, there may be used the above-mentioned compounds having at least one functional portion.

Of these compounds, those having well-balanced hydrophilic portions and hydrophobic portions may be directly used as such for forming monomolecular films. Otherwise, the hydrophilic groups and/or hydrophobic groups as mentioned above may be introduced newly into the molecules to form compounds suitable for formation of monomolecular films. As such compounds, the compounds represented by the structural formulae shown below may be employed.

In the structural formulae shown below, X and Y represent hydrophilic groups as mentioned above. When both of them exist in one molecule, either one of them may be hydrophilic and, in such a case, the other is hydrogen. In these formulae, R represents a straight or branched alkyl group having about 4 to 30 carbon atoms, preferably about 10 to 25 carbon atoms.

1.
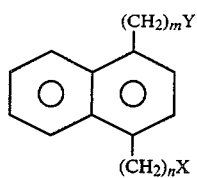
$0 \leqq m, n \leqq 25, 10 \leqq m + n$
2.
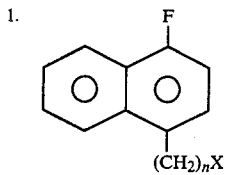
$10 \leqq n \leqq 25$
3.
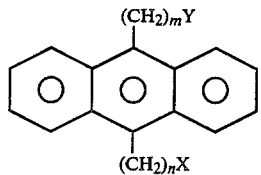
$0 \leqq m, n \leqq 20 \; 6 \leqq m + n$
4.
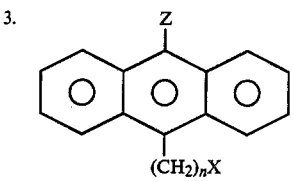
$Z = CN, F, Cl \; 6 \leqq n \leqq 20$
5.
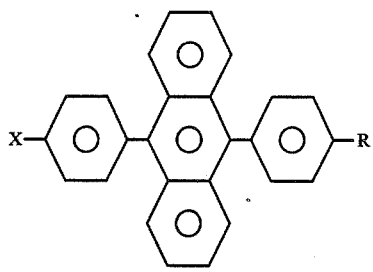
6.
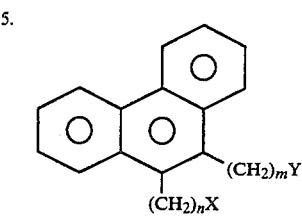
$0 \leqq m, n \leqq 20 \; 6 \leqq m + n$
7.
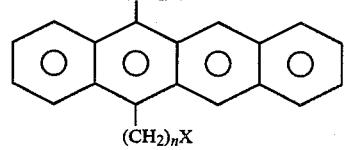
$0 \leqq m, n \leqq 20 \; 3 \leqq m + n$
8.
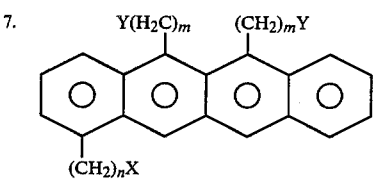
$0 \leqq m, n \leqq 20 \; 3 \leqq m + n$
9.
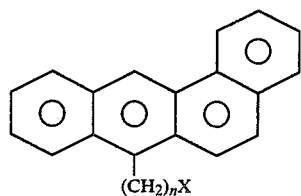
$3 \leqq n \leqq 20$
10.
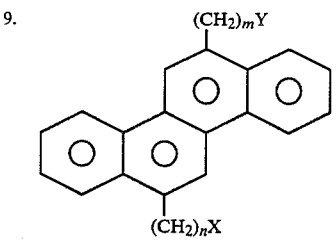
$0 \leqq m, n \leqq 20 \; 3 \leqq m + n$
11.
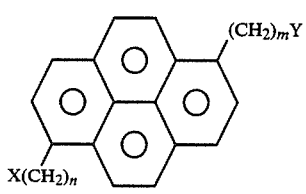
$0 \leqq m, n \leqq 20 \; 3 \leqq m + n$
12.
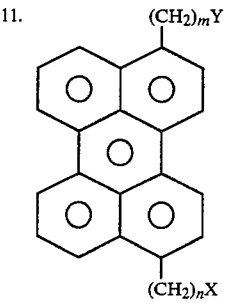
$0 \leqq m, n \leqq 20 \; 3 \leqq m + n$ 13.
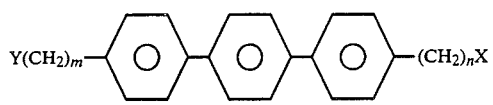
0 ≦ m, n ≦ 20  6 ≦ m + n
14.
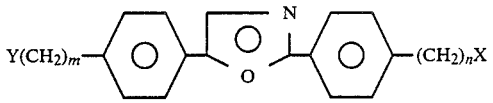
0 ≦ m, n ≦ 20  6 ≦ m + n
15.
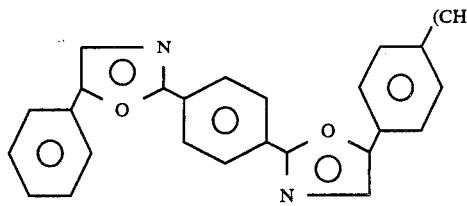
Y(CH₂)ₘ
0 ≦ m, n ≦ 20  6 ≦ m + n
16.
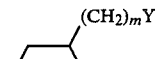
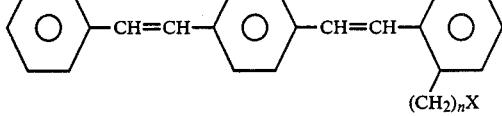
0 ≦ m, n ≦ 20  6 ≦ m + n
17.
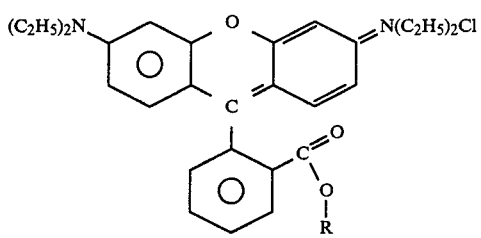
18.
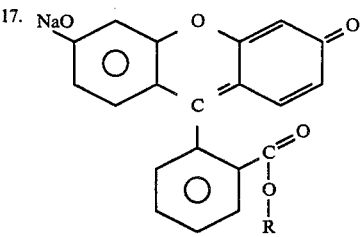
19.
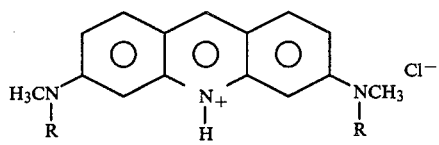
20.
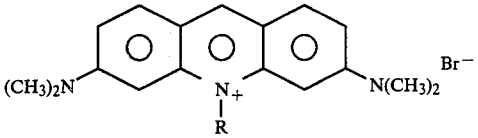
21.
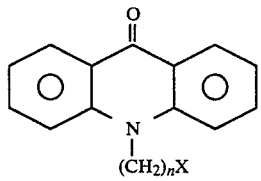
6 ≦ n ≦ 20
22.
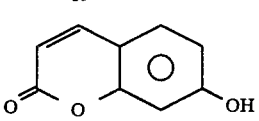
23.
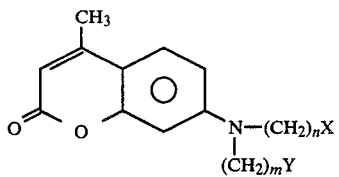
0 ≦ m, n ≦ 20  6 ≦ m + n
24.
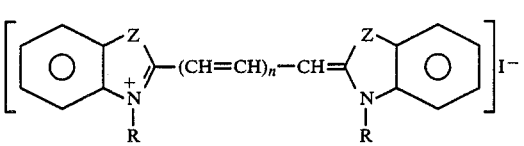
Z = O, S, Se   0 ≦ n ≦ 2
25.
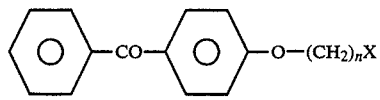
6 ≦ n ≦ 20
26.
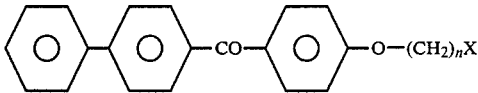
6 ≦ n ≦ 20
27.
6 ≦ n ≦ 20
28.
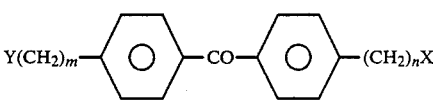
0 ≦ m, n ≦ 20  6 ≦ m + n -continued
29.
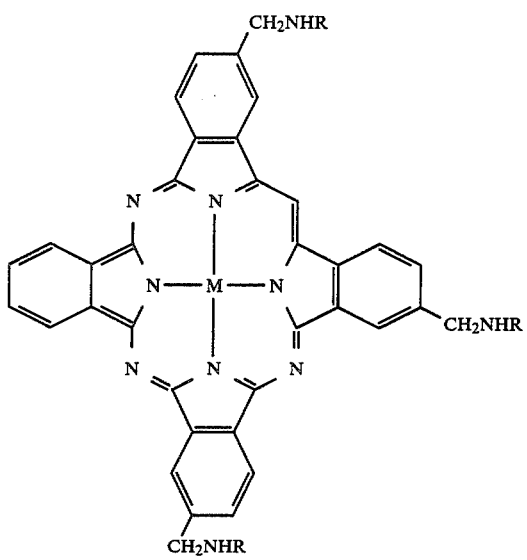
M = Mg, Zn, Sn, AlCl
30.
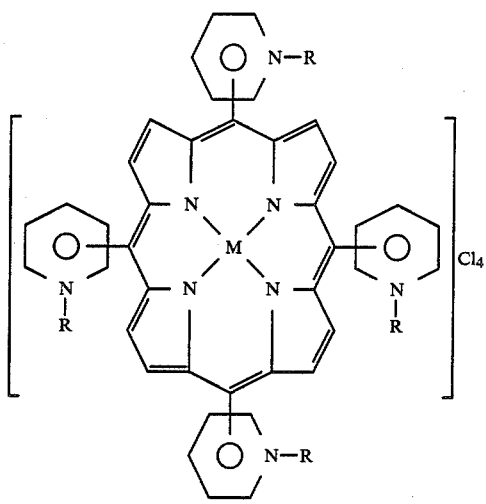
M = H₂, Be, Mg, Ca, Cd, Sr AlCl, YbCl
31.
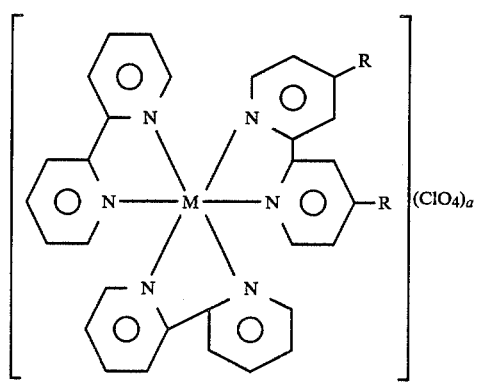
a, M = Ru, a = 2
b, M = Er, Tm, Sm, Eu, Tb, a = 3
32.
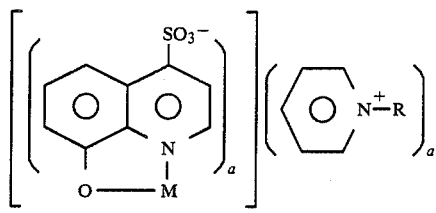
M = Al, Ga, Ir, Ta, a = 3
M = Zn, Cd, Mg, Pb, a = 2
33.
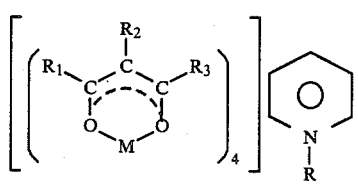
M = Er, Sm, Eu, Gd, Tb, Dy, Tm, Yb
R₁, R₂ R₃ = 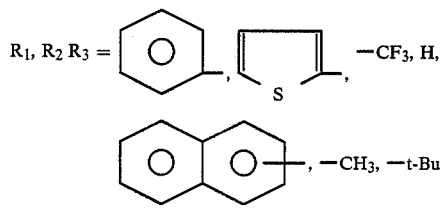
34.
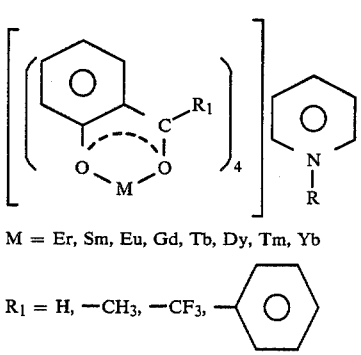
M = Er, Sm, Eu, Gd, Tb, Dy, Tm, Yb
R₁ = H, —CH₃, —CF₃, 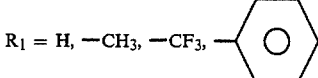

-continued

35.

36.

M = Er, Sm, Eu, Gd, Tb, Dy, Tm, Yb

R₁ = H, —CH₃, —CF₃, —phenyl

37.

38.

39.

40.

Z = S, Se

Z = S, Se

41.

42.

Z = S, Se

43.

44.

45.

46.

47.

48.

-continued
49. 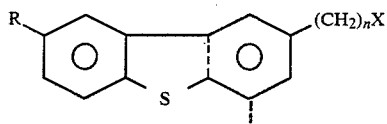 50.
51. 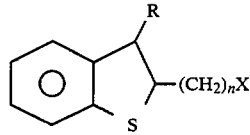 52.
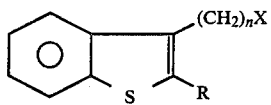
53. 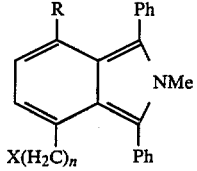 54.
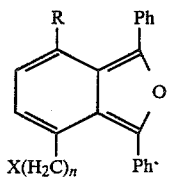
55. 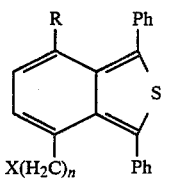 56.
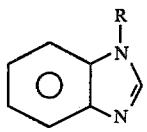
57. 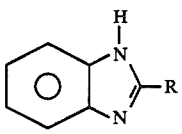 58.
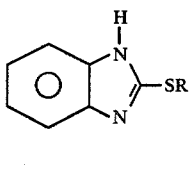
59. 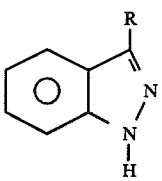 60.
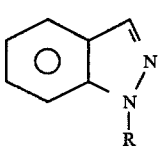
61. 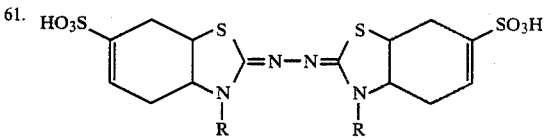 62.
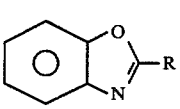
63. 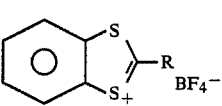 64.
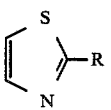
65. 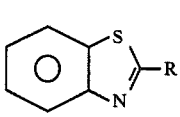 66.
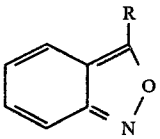
67. 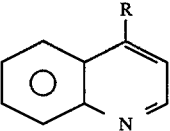 68.
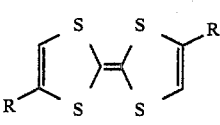
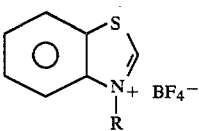

69.
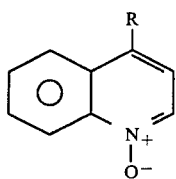
70.
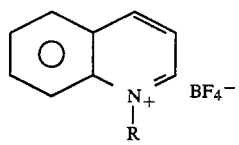
71.
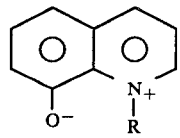
72.
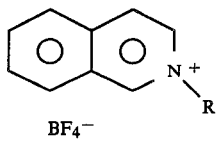
73.
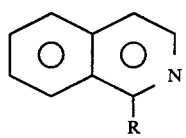
74.
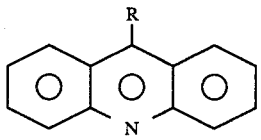
75.
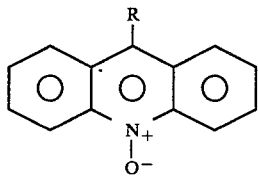
76.
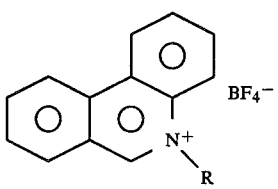
77.
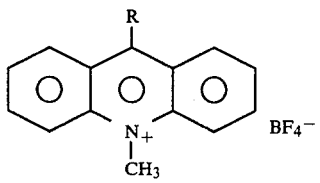
78.
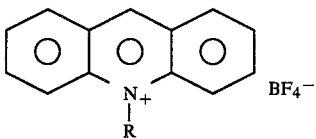
79.
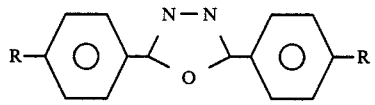
80.
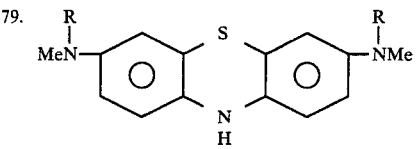
81.
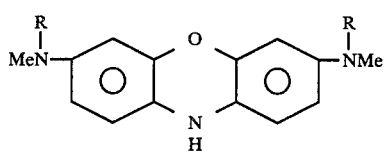
82.
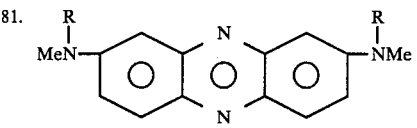
83.
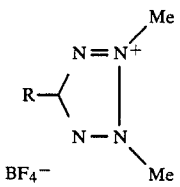
84.
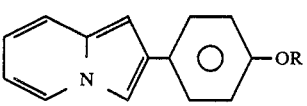

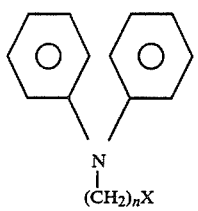

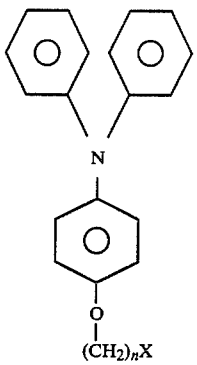

85.

86.

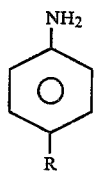

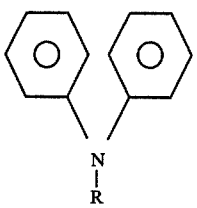

87.

88.

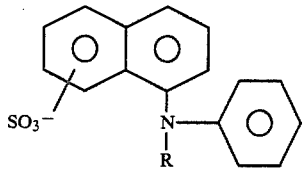

89.

The compounds for forming the monomolecular film represented by the structural formulae No. 1–No. 35 are obtained by modifying, using a hydrophobic group and/or hydrophilic group, the compounds having EL function resulting from formation of an excited complex among the compounds capable of forming a functional portion as mentioned above. The compounds of the structural formulae No. 42–No. 54 and No. 85–No. 86 have such structure that an alkyl chain is linked directly with the functional portion. Also the alkyl chain may be linked with the functional portion through, for example, an ether linkage, a carbonyl group or the like.

The compounds which can be applied to a thin film-forming method such as vapor deposition and the like among the compounds as mentioned above can also be used for forming a thin film layer excluding the monomolecular film and monomolecular built-up film. Similarly to the monomolecular film or the monomolecular built-up film, the above thin film layer may be composed of one or more kinds of compounds having the compound molecules at the main constituent forming the functional portion, and one or more kinds of other compounds other than the "one or more kind of the compound as the subconstituent having the functional portion". In such a case, as the above "other compounds", there may be mentioned compounds having no functional portion and capable of controlling the electrochemical characteristics of the luminescent layer by the interaction with the compounds having the functional portion, and further, compounds capable of increasing the strength of the layer and improving adhesion to other layers.

The third layers 4-1, 4-2 and 4-3 constituting the luminescent layer in the EL device of the present invention have an insulation property. Especially, the third layers 4-1 and 4-3 have the function for enhancing an insulation property of the condenser structure of the EL device of the present invention, and layer 4-2 has the function for confining electrons within a minimum required and generating efficient luminescence resulting from donating and accepting efficiently electrons. As the materials capable of constituting these layers, there may be mentioned the compounds capable of forming a monomolecular layer having a precise and uniform insulation property or the like represented by the following general formulae;

$$CH_3-(CH_2)_n-X, \text{ or } \begin{array}{l} CH_2OCO-(CH_2)_n-CH_3 \\ | \\ CHOCO-(CH_2)_n-CH_3 \\ | \\ CH_2OCO-(CH_2)_n-CH_3 \end{array}$$

(wherein n is $10 \leq n \leq 30$, and X is a group of —COOH, —CONH$_2$, —COOR, —N$^+$(CH$_3$)$_3$ · Cl$^{-1}$,

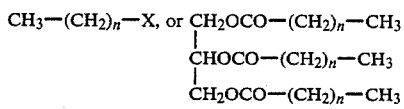

or the like.)

The third layer may be composed of the monomolecular film or the monomolecular built-up film. In the case of the monomolecular built-up film, each monomolecular film may be the same, or one or more of the monomolecular films may be different from other monomolecular films in the built-up film. Further, the third layer may be the monomolecular film comprising one compound, or a multicomponent type monomolecular film comprising two or more compounds. In the case of the third layer excluding the monomolecular and monomolecular built-up film, the layer can be formed with one or more of the above materials by a thin film-forming method such as a vapor deposition method, CVD method and the like.

Illustrated above by referring to FIG. 1 is the EL device of the present invention having two interfaces formed by the first layer and the second layer, but the number of the above interfaces in the EL device of the present invention are not to be construed as being limitative of the above. That is, the EL device having three or more of the above interfaces may be also fabricated.

A thickness of each layer constituting the luminescent layer in the EL device of the present invention, being the constitution as shown above, may depend on the number of the interfaces in the EL device and the type of each layer. In the case where each layer is formed by the LB method to form the monomolecular film or the monomolecular built-up film, its thickness is 300 Å or less, preferably 100 Å or less. In the case where each layer is formed by other methods, its thickness is 500 Å or less, preferably 200 Å or less. Further, it is desired to generate good luminescent state in low voltage driving so that a thickness of the whole of the luminescent layer is 1 μm or less, preferably 3000 Å or less.

At least one of the two electrode layers to be possessed by the EL device of the present invention is formed as a transparent electrode to transmit light.

In the case where a transparent electrode layer is formed, $I_nO_2$, $S_nO_2$, indium-tin-oxide(I.T.O.) or the like can be deposited on a transparent substrate, for example, a film or sheet such as PMMA, polyester and the like or a glass plate, or directly on the luminescent layer by a vapor deposition method or the like.

In the case of an opaque electrode, Al, Ag, Au or the like can be deposited on a suitable substrate or a thin plate composed of a material capable of forming a general electrode having sufficient conductivity, or directly on the luminescent layer by a vapor deposition method or the like.

A thickness of these electrode layers is about 0.01 μm–0.3 μm, preferably about 0.05 μm–0.2 μm.

The EL device of the present invention may be formed into various shapes and sizes as desired. For example, a substrate on which the transparent electrode is formed is used as the substrate for forming the luminescent layer, and this substrate of plate shape, belt shape or cylinder shape is formed into the desired shape and size.

A direct current, an alternating current, or a pulse voltage is applied to the EL device of the present invention of a constitution as illustrated above so that an electric field of about $1 \times 10^5 - 3 \times 10^6$ V/cm occurs between the electrodes 1 and 2 of the EL device, for example, in the luminescent layer 3. Thereby, good luminescence from the luminescent layer 3 can be generated through the transparent electrode.

Illustrated is a typical operation of a monomolecular built-up method represented by Langmuir-Blodgett method (LB method) applied to formation of the luminescent layer of the EL device of the present invention.

A cleaned substrate is immersed in the water phase for formation of the monomolecular film in the water bath. Next, a predetermined volume of the solution of the compound for forming the monomolecular film, dissolved or dispersed in the suitable solvent, is spread on the surface of the water to form a compound film, that is, a monomolecular film. At this time, a partition plate (or float) is provided so that the monomolecular film may not be freely and too widely diffused on the water surface, and the aggregation state of the film-forming material is controlled by restricting the spread area to obtain a surface pressure $\pi$ proportionable to the aggregation state. The partition plate is moved to narrow the spread area and raise gradually the surface pressure $\pi$ to the suitable value for the formation of the monomolecular film. By gently moving up and down the substrate in the direction vertical to the water surface while maintaining this surface pressure $\pi$, the monomolecular film is transferred to the substrate on every upward movement and every downward movement, thereby forming the monomolecular built-up film. The monomolecular film can be transferred to the substrate not only by the vertical dipping method but also by the various methods as follows:

(1) The horizontal lifting method which is to transfer the monomolecular film by contacting horizontally a substrate with the water surface;

(2) The cylinder rotation method which is to transfer the monomolecular film to the surface of the cylindrical substrate by rotating the substrate on the water surface;

(3) The method by which the substrate is pushed out into water from a substrate roll.

In the case of the vertical dipping method, a Y-type film is formed since the orientation of the film-forming molecules is reversed between pulling-up and dipping processes. In the case of the horizontal lifting method, an X-type film is formed as the built-up film, since the hydrophobic group is oriented toward the substrate. However, such an orientation of the hydrophilic group and the hydrophobic group may be changed by surface treatment of the substrate or the like.

During formation of the monomolecular film or the monomolecular built-up film constituting the luminescent layer of the EL device of the present invention by the monomolecular built-up method, the operation conditions such as pH of the water, the kind and volume of additives for controlling pH and the like of the water, temperature of the water, a rate for moving up and down the substrate, surface pressure and the like are optionally determined depending on the kind of the monomolecular film-forming compounds to be used and the characteristics of the film to be formed.

By using the monomolecular built-up method or, if desired, using another thin film-forming method in combination therewith, for example, the luminescent layers of the present invention may be formed as described below (1)–(7).

(1) First, the third layer composed of the monomolecular film or the monomolecular built-up film of the desired constitution is formed with the material for forming the third layer on the substrate as described above on which the transparent electrode layer is formed. Next, with the material capable of forming the first layer and the second layer as described above, the first layer and the second layer composed of the monomolecular film or the monomolecular built-up film of the desired constitution are successively formed on the third layer formed previously.

Further, the third layer is formed on the second layer. The operation for forming the layers from the first layer to the third layer is repeated two times or more according to the desired number of the interfaces formed by the first layer and the second layer.

(2) The desired third layer is formed with the material for forming the third layer as described above by a vapor deposition method or the like on the substrate as described above on which the transparent electrode layer is formed. Next, with the material capable of forming the first layer and the second layer as described above, the first layer and the second layer composed of the monomolecular film or the monomolecular built-up film of the desired constitution are successively formed on the third substrate formed previously.

Further, the third layer is formed on the second layer. The operation for forming the layers from the first layer to the third layer is repeated two times or more according to the desired number of the interfaces formed by the first layer and the second layer.

(3) The third layer composed of the monomolecular film or the monomolecular built-up film of the desired constitution is formed with the material for forming the third layer as described above on the substrate on which the transparent electrode layer is formed. Next, the first layer of the desired constitution is formed with the material capable of forming the first layer as described above by a vapor deposition method or the like on the above third layer, and then, the second layer composed of the monomolecular film or the monomolecular built-up film of the desired constitution is formed with the material capable of forming the second layer as described above on the above first layer.

Further, the third layer is formed on the second layer. The operation for forming the layers from the first layer to the third layer is repeated two times or more according to the desired number of the interfaces formed by the first layer and the second layer.

(4) The third layer composed of the monomolecular film or the monomolecular built-up film of the desired constitution is formed with the material for forming the third layer as described above on the substrate on which the transparent electrode layer is formed. Next, the first layer composed of the monomolecular film or the monomolecular built-up film of the desired constitution is formed with the material capable of forming the first layer as described above on the above third layer, and then, the second layer of the desired constitution is formed with the material capable of forming the second layer as described above by a vapor deposition method or the like on the above first layer.

Further, the third layer is formed on the second layer. The operation for forming the layers from the first layer to the third layer is repeated two times or more according to the desired number of the interfaces formed by the first layer and the second layer.

(5) The third layer of the desired constitution is formed with the material for forming the third layer as described above by a vapor deposition method or the like on the substrate as described above on which the transparent electrode layer is formed. Next, the first layer composed of the monomolecular film or the monomolecular built-up film of the desired constitution is formed with the material capable of forming the first layer as described above on the above third layer, and then, the second layer of the desired constitution is formed with the material capable of forming the second layer as described above by a vapor deposition method or the like on the above first layer.

Further, the third layer is formed on the second layer. The operation for forming the layers from the first layer to the third layer is repeated two times or more according to the desired number of the interfaces formed by the first layer and the second layer.

(6) The third layer of the desired constitution is formed with the material for forming the third layer as described above by a vapor deposition method on the substrate on which the transparent electrode layer is formed. Next, the first layer of the desired constitution is formed with the material capable of forming the first layer as described above by a vapor deposition method or the like on the above third layer, and then, the second layer composed of the monomolecular film or the monomolecular built-up film of the desired constitution is formed with the material capable of forming the second layer as described above on the above first layer.

Further, the third layer is formed on the second layer. The operation for forming the layers from the first layer to the third layer is repeated two times or more according to the desired number of interfaces formed by the first layer and the second layer.

(7) The third layer composed of the monomolecular film of or the monomolecular built-up film of the desired constitution is formed with the material for forming the third layer as described above on the substrate on which the transparent electrode layer is formed. Next, with the materials capable of forming the first layer and the second layer as described above, the first layer and the second layer of the desired constitution are successively formed on the above third layer by a vapor deposition method or the like.

Further, the third layer is formed on the second layer. The operation for forming the layers from the first layer to the third layer is repeated two times or more according to the desired number of the interfaces formed by the first layer and the second layer.

Finally, on these third layers, metals such as Al, Ag, Au and the like can be deposited by a vapor deposition method or the like to form the EL devices of the present invention.

In the case where an opaque electrode plate or a substrate having an opaque electrode layer is used for forming the luminescent layer thereon, the material such as I.T.O. and the like for forming the transparent electrode layer may be deposited by a vapor deposition method or the like on the luminescent layer formed on the above substrate. In the case where both of the two electrodes are transparent, the transparent electrode layer is formed with the above-mentioned material on the transparent substrate for forming the luminescent layer, and after formation of the luminescent layer, the transparent electrode layer may be formed on the above luminescent layer.

Each of the first layers constituting the luminescent layer in the EL device of the present invention may have the same constitution. One or more of the first layers may differ from other first layers in the constitution. It is the same with the second and third layers. An adhesive layers may be provided for enhancing the adhesiveness between each of the layers constituting the EL device of the present invention. Further, the EL device of the present invention may have desirably a structure to be protected from moisture and oxygen in air.

The EL device of the present invention as described above generates mainly the luminescence in the interface formed by the two layers different in electrochemical property with respect to each other. The plural interfaces are provided perpendicularly to the generation direction of the light in the EL device. The quantity of the luminescence per the unit of the light-generating area can be extremely increased as compared with a conventional EL device.

Further, the EL device of the present invention having the plural interfaces for the luminescence make it possible to control a luminescent color, as desired, by combining the adjacent layers forming the interface, each having different constitution one from the other.

The luminescent layer in the EL device of the present invention is mainly formed with the organic compound materials by a method for forming the thin film suitable to the above materials. Especially, although the luminescent layer is the multilayer structure having the plural interfaces for the luminescence, the whole luminescent layer may be thinly formed by composing at least one of the layers constituting the luminescent layer of the monomolecular film or the monomolecular built-up film. Thereby, the efficient luminescent state and the sufficient intensity of the light are obtained in the low voltage driving.

In the case where the layer participating directly in the luminescence in the EL device of the present invention is composed of the monomolecular film or the monomolecular built-up film, the funtional portion of the compound participating directly in the luminescence is regularly orientated and arranged with precision toward the interface, and a compound which is electron-acceptable relative to a compound participating directly in the luminescence and a compound which is electron-donative relative to a compound participating directly in the luminescence are contained in each layer in the luminescent layer except the third layers. Thereby, the more efficient luminescence resulting from formation of an excited complex caused by donating and accepting electrons becomes possible. The monomolecular film may be formed at ordinary temperature and pressure. Further, as a constitution material of each layer in the luminescent layer, there may be used an organic compound sensitive to heat which is not suitable to the vapor deposition method or the like.

Each layer in the luminescent layer in the EL device of the present invention may be formed as a thin film good in precision with a variety of organic compound materials. Further, the EL device may be sold at a low price and produced in large quantities.

Hereinafter, the EL-device of the present invention will be described in more detail by reference to examples.

Example 1a

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of $CaCl_2$ was contained in the aqueous phase to adjust its pH to 6.5.

Subsequently, a solution (0.5 ml) of arachidic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of arachidic acid was formed thereon.

Then, with the surface pressure being kept constant, the electrode was gently moved upwardly across the surface at a rate of 2 cm/min, and thereby a monomolecular film consisting of molecules of arachidic acid was formed on the electrode layer of said electrode plate. It was pulled out of the aqueous phase and allowed to stand for more than 30 minutes at room temperature for drying. The above procedure was repeated once more, and thereby an insulating layer in which two monomolecular films consisting of molecules of arachidic acid were accumulated was formed as the third layer.

Next, arachidic acid left on the surface of the aqueous phase was completely removed therefrom, and newly a solution (0.5 ml) of

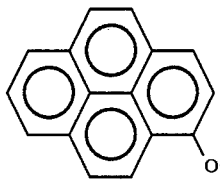

and

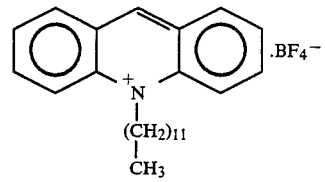

(at a ratio of 100 mol: 1 mol and a total concentration of $1 \times 10^{-3}$ mol/l) in chloroform was spread on the aqueous phase. Then, with the surface pressure being adjusted to 30 dyne/cm, the electrode plate having an insulating layer of arachidic acid was again immersed gently in the aqueous phase by being moved across the surface at a rate of 2 cm/min, and thereby a monomolecular film consisting of molecules of the above two kinds of compounds was formed on the insulating layer as the first layer. It was then pulled out of the aqueous phase, and allowed to stand for more than 30 minutes at room temperature for drying.

Furthermore, the above compounds left on the surface of the aqueous phase were completely removed, and newly a solution (0.5 ml) of

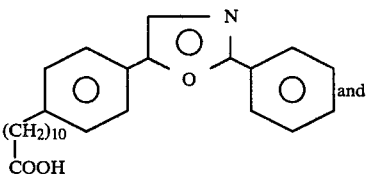

and

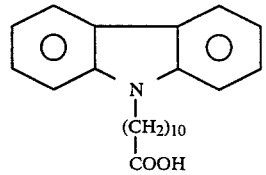

(at a ratio of 100 mol:1 mol and a total concentration of $1 \times 10^{-3}$ mol/l) in chloroform was spread on the aqueous phase. Then, with the surface pressure being adjusted to 30 dyne/cm, the above-described film-forming procedure for the first layer was repeated, and thereby a monomolecular film consisting of the above two kinds of compounds was formed as the second layer on the first layer formed before.

Thereafter, the above-described procedure of forming the third to the second layer in one group was repeated five times; finally, the third layer was laid over the last group of lamination to thereby obtain an integral luminescent layer (ca. 500 Å thick) containing therein five interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The results are shown in Table 1a.

Examples 2a–4a

According to the process in Example 1a, except for repeating the procedure of forming the third to the second layer seven times (Example 2a), nine times (Example 3a) or fifteen times (Example 4a), EL-devices of the present invention comprising seven interfaces (Examples 2a), nine interfaces (Example 3a) or fifteen interfaces (Example 4a) were fabricated, and EL-cells were manufactured by using those.

Each EL-cell was made to emit light similarly to Example 1a, and the luminance and the current density was measured. The results are shown in Table 1a.

Example 5a

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mil/l of $CaCl_2$ was contained in the aqueous phase to adjust its pH to 6.5.

Subsequently, a solution (0.5 ml) of arachidic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of arachidic acid was formed thereon.

Then, with the surface pressure being kept constant, the electrode was gently moved upwardly across the surface at a rate of 2 cm/min, and thereby a monomolecular film consisting of molecules of arachidic acid was formed on the electrode layer of said electrode plate. It was pulled out of the aqueous phase and allowed to stand for more than 30 minutes at room temperature for drying. The above procedure is repeated four times more, and thereby a monomolecular-layer built-up film in which five monomolecular films consisting of molecules of arachidic acid were accumulated was formed as the third layer.

Next, arachidic acid left on the surface of the aqueous phase was completely removed therefrom, and newly a solution (0.5 ml) of

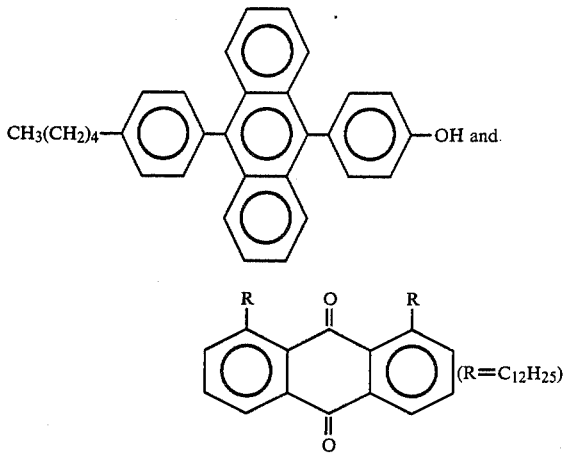

(at a ratio of 100 mol:1 mol and a total concentration of $1 \times 10^{-3}$ mol/l) in chloroform was spread on the aqueous phase. Then, with the surface pressure being adjusted to 30 dyne/cm, the electrode plate having an insulating layer of arachidic acid was again immersed gently in the aqueous phase by being moved across the surface at a rate of 2 cm/min, and thereby a monomolecular film consisting of molecules of the above two kinds of compounds was formed on the insulating layer as the first layer. It was pulled out of the aqueous phase, and allowed to stand for more than 30 minutes at room temperature for drying.

Furthermore, the above compounds left on the surface of the aqueous phase were completely removed, and newly a solution (0.5 ml) of

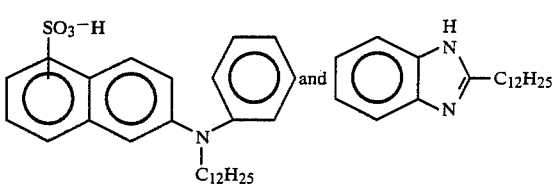

(at a ratio of 10 mol:1 mol and a total concentration of $1 \times 10^{-3}$ mol/l) in chloroform was spread on the aqueous phase. Then, with the surface pressure being adjusted to 30 dyne/cm, the above-described film-forming procedure for the first layer was repeated, and thereby a monomolecular film consisting of the above two kinds of compounds was formed as the second layer on the first layer formed before.

Thereafter, the above-described procedure of forming the third to the second layer in one group was repeated four times; finally, the third layer was laid over the last group of lamination to thereby obtain an integral luminescent layer (ca. 1100 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The results are shown in Table 1a.

Example 1b

An ITO layer of a film thickness of 1500 Å was formed on a glass surface of 50 mm square according to the sputtering method to afford a transparent electrode plate 44.

This electrode plate was placed on a predetermined position in the vapor-deposition chamber of the resistance heating vapor-deposition apparatus, and methyl stearate (m.p. 38° C.) was put into the resistance heating boat. After the inner pressure of the chamber was reduced to $10^{-6}$ Torr, the electric current running through the resistance heating boat was regulated so that the vapor-deposition rate could be 2 Å/sec, and thereby a vapor-deposition layer consisting of a methyl stearate layer of 200 Å thick was formed as the third layer on the transparent electrode layer of said electrode plate. The pressure in the chamber was adjusted to $9 \times 10^{-6}$ Torr and the temperature of the substrate holder to 20 C. during vapor deposition.

This electrode plate was immersed in an aqueous phase in Langmuir-Trough 4 (tradename, manufactured by Joyce-Loebel Co., Ltd.) where $4 \times 10^{-4}$ mol/l of CaCl₂ was contained in the aqueous phase to adjust its pH to 6.5.

Next, a solution (0.5 ml) of

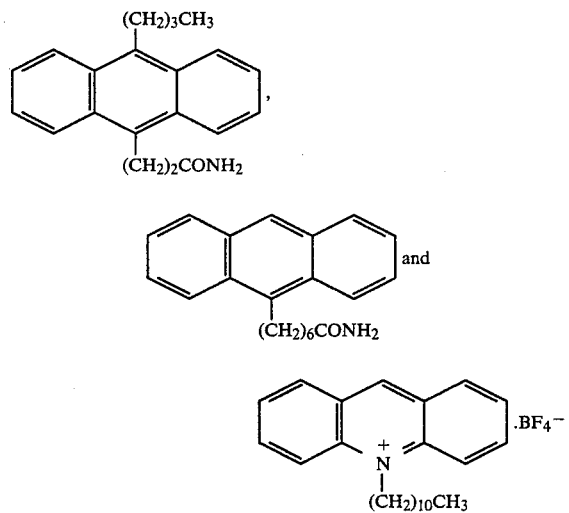

(at a ratio of 50 mol:50 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above three compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the third layer formed before. This electrode plate was pulled out of the aqueous phase, and allowed to stand for 30 minutes for drying.

Furthermore, after the above compounds left on the surface of the aqueous phase were completely removed, the electrode plate was immersed therein, and newly a solution (0.5 ml) of

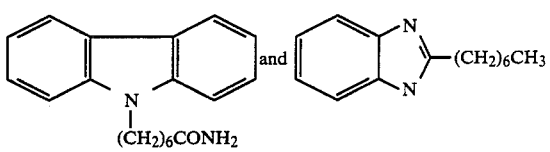

(at a ratio of 100 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above two compounds was formed. Then, the electrode plate was gently reciprocated twice in the up and down direction across the surface of the aqueous phase at a ratio of 2 cm/min, and thereby a monomolecular-layer built-up film in which four monomolecular films of the above compounds were accumulated was formed as the first layer on the second layer formed before.

Thereafter, the above-described procedure of forming the third to the first layer in one group was repeated four times; finally, the third layer was laid over the last group of lamination to thereby obtain an integral luminescent layer (ca. 1700 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 19.2 fL at a current density of 0.08 mA/cm².

Example 1c

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of CaCl₂ was contained in the aqueous phase to adjust its pH to 6.5.

Subsequently, a solution (0.5 ml) of stearic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of stearic acid was formed thereon.

Then, with the surface pressure being kept constant, the electrode was gently moved upwardly across the surface at a rate of 2 cm/min, and thereby a monomolecular film consisting of molecules of stearic acid was formed on the electrode layer of said electrode plate. It was pulled out of the aqueous phase and allowed to stand for more than 30 minutes at room temperature for drying. The above procedure was repeated twice more, and thereby a monomolecular-layer built-up film in which three monomolecular films consisting of molecules of stearic acid were accumulated was formed as the third layer on the electrode layer of said electrode plate. Stearic acid left on the surface of the aqueous phase was completely removed therefrom.

Next, the electrode plate was placed on a predetermined position in the vapor-deposition chamber of the resistance heating vapor-deposition apparatus, and anthracene (m.p. 216° C.) was put into one of the resistance heating boats while anthraquinone (m.p. 286° C.) was put into another resistance heating boat. After the inner pressure of the chamber was reduced to $10^{-6}$ Torr, the electric current running through the boat holding anthraquinone was maintained at a given constant value so that the deposition rate of anthraquinone could be approximately 0.1 Å/sec, while the electric current running through the boat holding anthracene was regulated so that the total deposition rate of anthracene and anthraquinone could be 2 Å/sec, and thereby a vapor-deposited film of 200 Å thick consisting of a mixture of anthracene and anthraquinone was formed as the first layer on the third layer formed before as the insulating layer. The pressure in the chamber was adjusted to $9 \times 10^{-6}$ Torr, and the temperature of the substrate holder to 20° C.

After the first layer was formed as above, the electrode plate was immersed in the aforementioned aqueous phase where stearic acid left thereon was completely removed, and newly a solution (0.5 ml) of

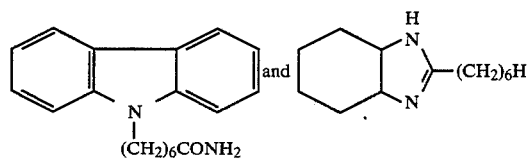

(at a ratio of 10 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above two compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the third layer formed before. This electrode plate was pulled out of the aqueous phase, and allowed to stand for more than 30 minutes at room temperature for drying.

Thereafter, the third layer in which four monomolecular films of stearic acid were accumulated was laid over the second layer according to the film-forming method as described before. The above procedure of forming the first to the third layer in one group was repeated four times to thereby obtain an integral luminescent layer (ca. 1600 Å thick) containing therein four interfaces between the first and the second layer of each group of lamination.

The electrode plate on which the luminescent layer was formed was again placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 29 fL at a current density of 0.11 mA/cm$^2$.

Example 1d

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mil/l of CaCl$_2$ was contained in the aqueous phase to adjust its pH to 6.5.

Subsequently, a solution (0.5 ml) of arachidic acid $(1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of arachidic acid was formed thereon.

Then, with the surface pressure being kept constant, the electrode was gently moved upwardly across the surface at a rate of 2 cm/min, and thereby a monomolecular film consisting of molecules of stearic acid was formed on the electrode layer of said electrode plate. It was pulled out of the aqueous phase and allowed to stand for more than 30 minutes at room temperature for drying. The above procedure was repeated twice more, and thereby a monomolecular-layer built-up film in which three monomolecular films consisting of molecules of stearic acid were accumulated was formed as the third layer on the electrode layer of said electrode plate. Stearic acid left on the surface of the aqueous phase was completely removed therefrom.

Next, the electrode plate on which the third layer was formed was again immersed in the aqueous phase where stearic acid left thereon was completely removed, and newly a solution (0.5 ml) of

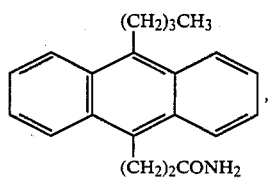

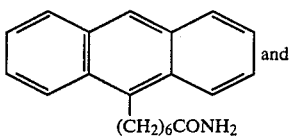

and

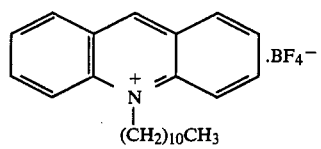

.BF$_4^-$ (at a ratio of 50 mol:50 mol:1 mol and a total concentration of $1\times10^{-3}$ mol/l) in chloroform was spread on the aqueous phase. Then, with the surface pressure being adjusted to 30 dyne/cm, a multicomponent monomolecular film consisting of molecules of the above three compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the third layer formed before. This electrode plate was pulled out of the aqueous phase, and allowed to stand for more than 30 minutes at room temperature for drying.

Next, the electrode plate was placed on a predetermined position in the vapor-deposition chamber of the resistance heating vapor-deposition apparatus, and 2,5-diphenyloxazole was put into one of the resistance heating boats while carbazole was put into another resistance heating boat. After the inner pressure of the chamber was reduced to $10^{-6}$ Torr, the electric current running through the boat holding carbazole was maintained at a given constant value so that the deposition rate of carbazole could be approximately 0.2 Å/sec, while the electric current running through the boat holding 2,5-diphenyloxazole was regulated so that the total deposition rate of carbazole and 2,5-diphenyloxazole could be 2 Å/sec, and thereby a vapor-deposited film of 200 Å thick consisting of a mixture of 2,5-diphenyloxazole and carbazole was formed as the second layer on the first layer formed before as the insulating layer. The pressure in the chamber was adjusted to $9\times10^{-6}$ Torr, and the temperature of the substrate holder to 20° C.

Thereafter, the third layer in which four monomolecular films of stearic acid were accumulated was laid over the second layer according to the film-forming method as described before. The above procedure of forming the first to the third layer in one group was repeated four times to thereby obtain an integral luminescent layer (ca. 1600 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 31 fL at a current density of 0.11 mA/cm$^2$.

Example 1e

An ITO layer of a film thickness of 1500 Å was formed on a glass surface of 50 mm square according to the sputtering method to afford a transparent electrode plate 44.

This electrode plate was placed on a predetermined position in the vapor-deposition chamber of the resistance heating vapor-deposition apparatus, and methyl stearate (m.p. 38° C.) was put into the resistance heating boat. After the inner pressure of the chamber was reduced to $10^{-6}$ Torr, the electric current running through the resistance heating boat was regulated so that the vapor-deposition rate could be 2 Å/sec, and thereby a vapor-deposited layer consisting of a methyl stearate layer of 200 Å thick was formed as the third layer on the transpatent electrode layer of said electrode plate. The pressure in the chamber was adjusted to $9\times10^{-6}$ Torr and the temperature of the substrate holder to 20° C. during vapor deposition.

This electrode plate was immersed in an aqueous phase in Langmuir-Trough 4 (tradename, manufactured by Joyce-Loevel Co., Ltd.) where $4\times10^{-4}$ mol/l of CaCl$_2$ was contained in the aqueous phase to adjust its pH to 6.5.

Subsequently, a solution (0.5 ml) of

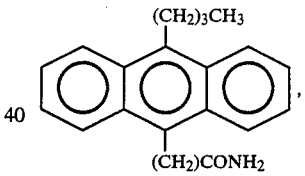

,

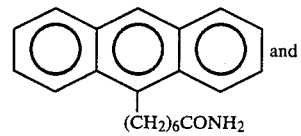

and

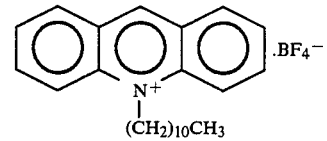

.BF$_4^-$ (at a ratio of 50 mol:50 mol:1 mol and a total concentration of $1\times10^{-3}$ mol/l) in chloroform was spread on the aqueous phase. Then, with the surface pressure being adjusted to 30 dyne/cm, a multicomponent monomolecular film consisting of molecules of the above three compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the third layer formed before. This electrode plate was pulled out of the aqueous phase, and allowed to stand for more than 30 minutes at room temperature for drying.

Next, the electrode plate was placed again on a predetermined position in the vapor-deposition chamber of the resistance heating vapor-deposition apparatus, and 2,5-diphenyloxazole was put into one of the resistance heating boats while carbazole was put into another resistance heating boat. After the inner pressure of the chamber was reduced to $10^{-6}$ Torr, the electric current running through the boat holding carbazole was maintained at a given constant value so that the deposition rate of carbazole could be approximately 0.2 Å/sec, while the electric current running through the boat holding 2,5-diphenyloxazole was regulated so that the total deposition rate of 2,5-diphenyloxazole and carbazole could be 2 Å/sec, and thereby a vapor-deposited film of 200 Å thick consisting of a mixture of 2,5-diphenyloxazole and carbazole was formed as the second layer on the first layer formed before as the insulating layer. The pressure in the chamber was adjusted to $9 \times 10^{-6}$ Torr, and the temperature of the substrate holder to 20° C.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 2200 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 26 fL at a current density of 0.13 mA/m².

Example 1f

An ITO layer of a film thickness of 1500 Å was formed on a glass surface of 50 mm square according to the sputtering method to afford a transparent electrode plate 44.

This electrode plate was placed on a predetermined position in the vapor-deposition chamber of the resistance heating vapor-deposition apparatus, and methyl stearate (m.p. 38° C.) was put into the resistance heating boat. After the inner pressure of the chamber was reduced to $10^{-6}$ Torr, the electric current running through the resistance heating boat was regulated so that the vapor-deposition rate could be 2 Å/sec, and thereby a vapor-deposited layer consisting of a methyl stearate layer of 200 Å thick was formed as the third layer on the transparent electrode layer of said electrode plate. The pressure in the chamber was adjusted to $9 \times 10^{-6}$ Torr and the temperature of the substrate holder to 20° C. during vapor deposition.

Next, the electrode plate was left as it was on a predetermined position in the vapor-deposition chamber of the resistance heating vapor-deposition apparatus, and anthracene (m.p. 216° C.) was put into one of the resistance heating boats while anthraquinone (m.p. 286° C.) was put into another resistance heating boat. After the inner pressure of the chamber was reduced to $10^{-6}$ Torr, the electric current running through the boat holding anthraquinone was maintained at a given constant value so that the deposition rate of anthraquinone could be approximately 0.1 Å/sec, while the electric current running through the boat holding anthracene was regulated so that the total deposition rate of anthracene and anthraquinone could be 2 Å/sec, and thereby a vapor-deposited film of 200 Å thick consisting of a mixture of anthraquinone and anthracene was formed as the first layer on the third layer formed before as the insulating layer. The pressure in the chamber was adjusted to $9 \times 10^{-6}$ Torr, and the temperature of the substrate holder to 20° C.

This electrode plate was immersed in an aqueous phase in Langmuir-Trough 4 (tradename, manufactured by Joyce-Loebel Co., Ltd.) where $4 \times 10^{-4}$ mol/l of CaCl$_2$ was contained in the aqueous phase to adjust its pH to 6.5.

Subsequently, a solution (0.5 ml) of

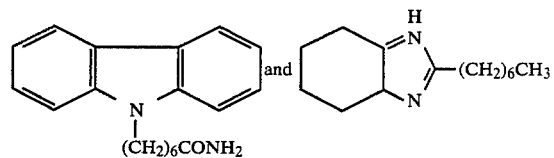

(at a ratio of 100 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above two compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the third layer formed before. This electrode plate was pulled out of the aqueous phase, and allowed to stand for more than 30 minutes at room temperature for drying.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 2200 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 24 fL at a current density of 0.13 mA/cm$^2$.

Example 1g

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of CaCl$_2$ was contained in the aqueous phase to adjust its pH to 6.5.

Subsequently, a solution (0.5 ml) of stearic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of stearic acid was formed thereon.

Then, with the surface pressure being kept constant, the electrode was gently moved upwardly across the surface at a rate of 2 cm/min, and thereby a monomolecular film consisting of molecules of stearic acid was formed on the electrode layer of said electrode plate. It was pulled out of the aqueous phase and allowed to stand for more than 30 minutes at room temperature for drying. The above procedure was repeated once more, and thereby a monomolecular-layer built-up film in which two monomolecular films consisting of molecules of stearic acid were accumulated was formed as the third layer on the electrode layer of said electrode plate. Stearic acid left on the surface of the aqueous phase was completely removed therefrom.

Next, the electrode plate was placed on a predetermined position in the vapor-deposition chamber of the resistance heating vapor-deposition apparatus, and anthracene (m.p. 216° C.) was put into one of the resistance heating boats while anthraquinone (m.p. 286° C.) was put into another resistance heating boat. After the inner pressure of the chamber was reduced to $10^{-6}$ Torr, the electric current running through the boat holding anthraquinone was maintained at a given constant value so that the deposition rate of anthraquinone could be approximately 0.1 Å/sec, while the electric current running through the boat holding anthracene was regulated so that the total deposition rate of anthracene and anthraquinone could be 2 Å/sec, and thereby a vapor-deposition film of 200 Å thick consisting of a mixture of anthracene and anthraquinone was formed as the first layer on the third layer formed before as the insulating layer. The pressure in the chamber was adjusted to $9 \times 10^{-6}$ Torr, and the temperature of the substrate holder to 20° C.

Next, the electrode plate was left as it was on a predetermined position in the vapor-deposition chamber of the resistance heating vapor-deposition apparatus, and carbazole (m.p. 245° C.) was put into one of the resistance heating boats while 2,5-diphenyloxazole was put into another resistance heating boat. After the inner pressure of the chamber was reduced to $10^{-6}$ Torr, the electric current running through the boat holding carbazole was maintained at a given constant value so that the deposition rate of carbazole could be approximately 0.4 Å/sec, while the electric current running through the boat holding 2,5-diphenyloxazole was regulated so that the total deposition rate of carbazole and 2,5-diphenyloxazole could be 2 Å/sec, and thereby a vapor-deposition film of 200 Å thick consisting of a mixture of 2,5-diphenyloxazole and carbazole was formed as the second layer on the first layer formed before as the insulating layer. The pressure in the chamber was adjusted to $9 \times 10^{-6}$ Torr, and the temperature of the substrate holder to 20° C.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 1800 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 36 fL at a current density of 0.14 mA/cm$^2$.

Example 1h

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of CaCl$_2$ was contained in the aqueous phase to adjust its pH to 6.5.

Subsequently, a solution (0.5 ml) of arachidic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of arachidic acid was formed thereon.

Then, with the surface pressure being kept constant, the electrode was gently moved upwardly across the surface at a rate of 2 cm/min, and thereby a monomolecular film consisting of molecules of arachidic acid was formed on the electrode layer of said electrode plate. It was pulled out of the aqueous phase and allowed to stand for more than 30 minutes at room temperature for drying. The above procedure was repeated once more, and thereby an insulating layer in which two monomolecular films consisting of molecules of arachidic acid were accumulated was formed as the third layer.

Next, arachidic acid left on the surface of the aqueous phase was completely removed therefrom, and newly a solution (0.5 ml) of

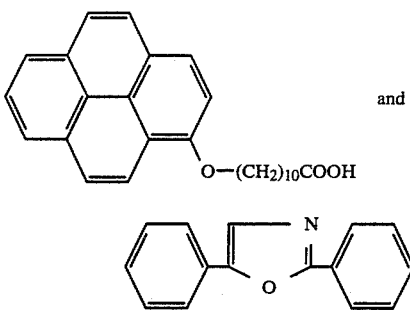

(at a ratio of 10 mol:1 mol and a total concentration of $1 \times 10^{-3}$ mol/l) in chloroform was spread on the aqueous phase. Then, with the surface pressure being adjusted to 30 dyne/cm, the electrode plate having an insulating layer of arachidic acid was again immersed gently in the aqueous phase by being moved across the surface at a rate of 2 cm/min, and thereby a monomolecular film consisting of molecules of the above two kinds of compounds was formed on the insulating layer as the first layer. It was pulled out of the aqueous phase, and allowed to stand for more than 30 minutes at room temperature for drying.

Furthermore, the above compounds left on the surface of the aqueous phase were completely removed, and newly a solution (0.5 ml) of

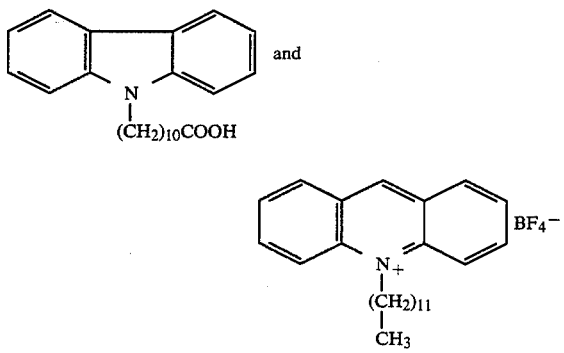

(at a ratio of 100 mol:1 mol and a total concentration of $1 \times 10^{-3}$ mol/l) in chloroform was spread on the aqueous phase. Then, with the surface pressure being adjusted to 30 dyne/cm, the above-described film-forming procedure for the first layer was repeated, and thereby a monomolecular film consisting of the above two kinds of compounds was formed as the second layer on the first layer formed before.

Thereafter, the above-described procedure of forming the third to the second layer in one group was repeated five times; finally, the third layer was laid over the last group of lamination to thereby obtain an integral luminescent layer (ca. 550 Å thick) containing therein five interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The results are shown in Table 1h.

EXAMPLE 2h–4h

According to the process in Example 1h, except for repeating the procedure of forming the third to the second layer seven times (Example 2h), nine times (Example 3h) or fifteen times (Example 4h), EL-devices of the present invention comprising seven interfaces (Example 2h), nine interfaces (Example 3h) or fifteen interfaces (Example 4h) were fabricated, and EL-cells were manufactured by using those.

Each EL-cell was made to emit light similarly to Example 1h, and the luminance and the current density was measured. The results are shown in Table 1h.

Example 5h

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of $CaCl_2$ was contained in the aqueous phase to adjust its pH to 6.5.

Subsequently, a solution of (0.5 ml) of arachidic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of arachidic acid was formed thereon.

Then, with the surface pressure being kept constant, the electrode was gently moved upwardly across the surface at a rate of 2 cm/min, and thereby a monomolecular film consisting of molecules of arachidic acid was formed on the electrode layer of said electrode plate. It was pulled out of the aqueous phase and allowed to stand for more than 30 minutes at room temperature for drying. The above procedure was repeated four times more, and thereby a monomolecular-layer built-up film in which five monomolecular films consisting of molecules of arachidic acid were accumulated was formed as the third layer.

Next, arachidic acid left on the surface of the aqueous phase was completely removed therefrom, and newly a solution (0.5 ml) of

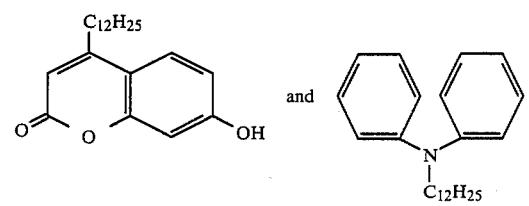

(at a ratio of 10 mol:1 mol and a total concentration of $1 \times 10^{-3}$ mol/l) in chloroform was spread on the aqueous phase. Then, with the surface pressure being adjusted to 30 dyne/cm, the electrode plate having an insulating layer of arachidic acid was again immersed gently in the aqueous phase by being moved across the surface at a rate of 2 cm/min, and thereby a monomolecular film consisting of molecules of the above two kinds of compounds was formed in the insulating layer as the first layer. It was pulled out of the aqueous phase, and allowed to stand for more than 30 minutes at room temperature for drying.

Furthermore, an aqueous phase saturated with [Eu(B-FA)$_4$]K was prepared in place of the aqueous phase used till then, and a solution of (0.5 ml) of

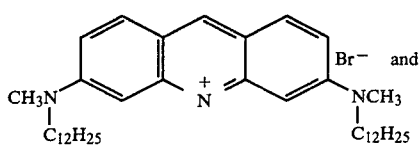

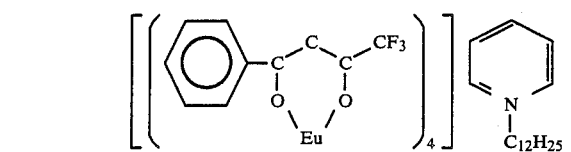

(at a ratio of 10 mol:1 mol and a total concentration of $1 \times 10^{-3}$ mol/l) in chloroform was spread on the aqueous phase. Then, with the surface pressure being adjusted to 30 dyne/cm, similarly to the above-described film-forming procedure for the first layer, a monomolecular-layer built-up film in which three monomolecular films consisting of the above two kinds of compounds were accumulated was formed as the second layer on the first layer formed before.

Thereafter, the third layer in which four monomolecular films of arachidic acid were accumulated was laid over the second layer according to the film-forming method as described before. The above procedure of forming the first to the third layer in one group was repeated four times to thereby obtain an integral luminescent layer (ca. 1100 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The results are shown in Table 1h.

EXAMPLE 1i

An ITO layer of a film thickness of 1500 Å was formed on a glass surface of 50 mm square according to the sputtering method to afford a transparent electrode plate 44.

This electrode plate was placed on a predetermined position in the vapor-deposition chamber of the resistance heating vapor-deposition apparatus, and methyl stearate (m.p. 38° C.) was put into the resistance heating boat. After the inner pressure of the chamber was reduced to $10^{-6}$ Torr, the electric current running through the resistance heating boat was regulated so that the vapor-deposition rate could be 2 Å/sec, and thereby a vapor-deposited layer consisting of a methyl stearate layer of 200 Å thick was formed as the third layer on the transparent electrode layer of said electrode plate. The pressure in the chamber was adjusted to $9 \times 10^{-6}$ Torr and the temperature of the substrate holder to 20° C. during vapor deposition.

This electrode plate was immersed in an aqueous phase in Langmuir-Trough 4 (tradename, manufactured by Joyce-Loebel Co., Ltd.) where $4 \times 10^{-4}$ mol/l of CaCl$_2$ was contained in the aqueous phase to adjust its pH to 6.5.

Next, a solution (0.5 ml) of

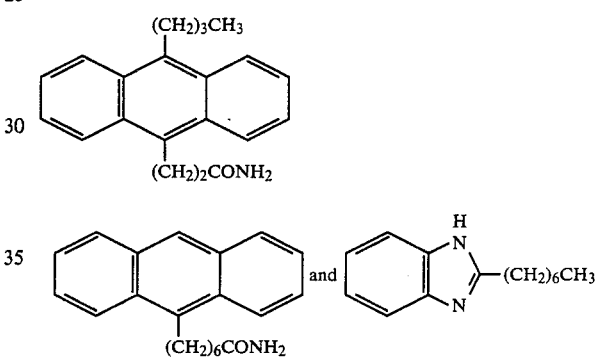

(at a ratio of 50 mol:50 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above three compounds were formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the third layer formed before. This electrode plate was pulled out of the aqueous phase, and allowed to stand for more than 30 minutes at room temperature for drying.

Furthermore, after the above compounds left on the surface of the aqueous phase were completely removed, the electrode plate was immersed therein, and newly a solution (0.5 ml) of

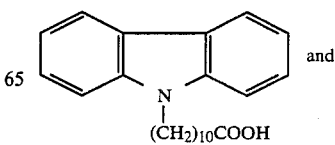

-continued

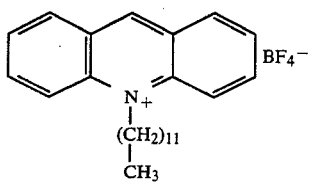

(at a ratio of 100 mol:1 mol and a total concentration of $1\times10^{-3}$ mol/l) in chloroform was spread on the aqueous phase. Then, with the surface pressure being adjusted to 30 dyne/cm, a multicomponent monomolecular film consisting of molecules of the above two compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accmulated was formed as the second layer on the first layer formed before.

Thereafter, the above-described procedure of forming the third to the second layer in one group was repeated four times; finally, the third layer was laid over the last group of lamination to thereby obtain an integral luminescent layer (ca. 1800 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, and Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 27 fL at a current density of 0.10 mA/cm².

Example 1j

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4\times10^{-4}$ mol/l of CaCl₂ was contained in the aqueous phase to adjust its pH to 6.5.

Subsequently, a solution (0.5 ml) of arachidic acid ($1\times10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of stearic acid was formed thereon.

Then, with the surface pressure being kept constant, the electrode was gently moved upwardly across the surface at a rate of 2 cm/min, and thereby a monomolecular film consisting of molecules of stearic acid was formed on the electrode layer of said electrode plate. It was pulled out of the aqueous phase and allowed to stand for more than 30 minutes at room temperature for drying. The above procedure was repeated twice more, and thereby a monomolecular-layer built-up film in which three monomolecular films consisting of molecules of stearic acid were accumulated was formed as the third layer on the electrode layer of said electrode plate. Stearic acid left on the surface of the aqueous phase was completely removed therefrom.

Next, the electrode plate was placed on a predetermined position in the vapor-deposition chamber of the resistance heating vapor-deposition apparatus, and anthracene (m.p. 216° C.) was put into one of the resistance heating boat while indazole (m.p. 145° C.) was put into another resistance heating boat. After the inner pressure of the chamber was reduced to $10^{-6}$ Torr, the electric current running through the boat holding indazole was maintained at a given constant value so that the deposition rate of indazole could be approximately 0.2 Å/sec, while the electric current running through the boat holding anthracene was regulated so that the total deposition rate of anthracene and indazole could be 2 Å/sec, and thereby a vapor-deposited film of 200 Å thick consisting of a mixture of anthracene and indazole was formed as the first layer on the third layer formed before as the insulating layer. The pressure in the chamber was adjusted to $9\times10^{-6}$ Torr, and the temperature of the substrate holder to 20° C.

After the first layer was formed as above, the electrode plate was immersed in the aqueous phase where stearic acid left thereon was completely removed, and newly a solution (0.5 ml) of

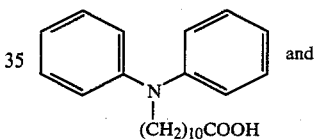

and

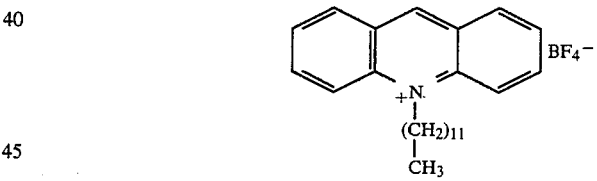

(at a ratio of 100 mol:1 mol and a total concentration of $1\times10^{-3}$ mol/l) in chloroform was spread on the aqueous phase. Then, with the surface pressure being adjusted to 30 dyne/cm, a multicomponent monomolecular film consisting of molecules of the above two compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the first layer formed before. This electrode plate was pulled out of the aqueous phase, and allowed to stand for more than 30 minutes at room temperature for drying.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 1500 Å thick) containing therein four interfaces between the first and the second layer of each group of lamination.

The electrode plate on which the luminescent layer was formed was placed again in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to the usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 28 fL at a current density of 0.09 mA/cm².

EXAMPLE 1k

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of CaCl₂ was contained in the aqueous phase to adjust its pH to 6.5.

Subsequently, a solution of (0.5 ml) of stearic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of stearic acid was formed thereon.

Then, with the surface pressure being kept constant, the electrode was gently moved upwardly across the surface at a rate of 2 cm/min, and thereby a monomolecular film consisting of molecules of stearic acid was formed on the electrode layer of said electrode plate. It was pulled out of the aqueous phase and allowed to stand for more than 30 minutes at room temperature for drying. The above procedure was repeated twice more, and thereby a monomolecular-layer built-up film in which three monomolecular films consisting of molecules of stearic acid were accumulated was formed as the third layer on the electrode layer of said electrode plate. Stearic acid left on the surface of the aqueous phase was completely removed therefrom.

Next, the electrode plate on which the third layer was formed was immersed in the aqueous phase where stearic acid left thereon was completely removed, and newly a solution of (0.5 ml) of

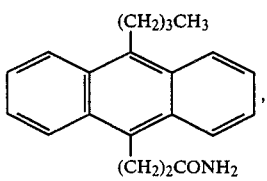

-continued

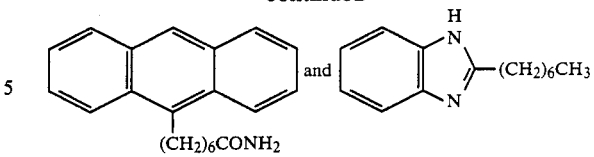

(at a ratio of 50 mol:50 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above three compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the first layer on the third layer formed before. This electrode plate was pulled out of the aqueous phase, and allowed to stand for more than 30 minutes at room temperature for drying.

Next, the electrode plate was placed on a predetermined position in the vapor-deposition chamber of the resistance heating vapor-deposition apparatus, and 2,5-diphenyloxazole was put into one of the resistance heating boats while anthraquinone was put into another resistance heating boat. After the inner pressure of the chamber was reduced to $10^{-6}$ Torr, the electric current running through the boat holding anthraquinone was maintained at a given constant value so that the deposition rate of anthraquinone could be approximately 0.1 Å/sec, while the electric current running through the boat holding 2,5-diphenyloxazole was regulated so that the total deposition rate of 2,5-diphenyloxazole and anthraquinone could be 2 Å/sec, and thereby a vapor-deposited film of 200 Å thick consisting of a mixture of 2,5-diphenyloxazole and anthraquinone was formed as the second layer on the first layer formed before. The pressure in the chamber was adjusted to $9 \times 10^{-6}$ Torr, and the temperature of the substrate holder to 20° C.

Thereafter, the third layer in which two monomolecular films of stearic acid were accumulated was laid over the second layer accorrding to the film-forming method as described before. The above procedure of forming the first to the third layer in one group was repeated four times to thereby obtain an integral luminescent layer (ca. 1500 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 29 fL at a current density of 0.11 mA/cm².

Example 1l

An ITO layer of a film thickness of 1500 Å was formed on a glass surface of 50 mm square according to the sputtering method to afford a transparent electrode plate 44.

This electrode plate was placed on a predetermined position in the vapor-deposition chamber of the resistance heating vapor-deposition apparatus, and methyl stearate (m.p. 38° C.) was put into the resistance heating boat. After the inner pressure of the chamber was reduced to $10^{-6}$ Torr, the electric current running through the resistance heating boat was regulated so that the vapor-deposition rate could be 2 Å/sec, and thereby a vapor-deposited layer consisting of a methyl stearate layer of 200 Å thick was formed as the third layer on the transparent electrode layer of said electrode plate. The pressure in the chamber was adjusted to $9 \times 10^{-6}$ Torr and the temperature of the substrate holder to 20° C. during vapor deposition.

This electrode plate was immersed in an aqueous phase in Langmuir-Trough 4 (tradename, manufactured by Joyce-Loebel Co., Ltd.) where $4 \times 10^{-4}$ mol/l of CaCl₂ was contained in the aqueous phase to adjust its pH to 6.5.

Subsequently, a solution (0.5 ml) of

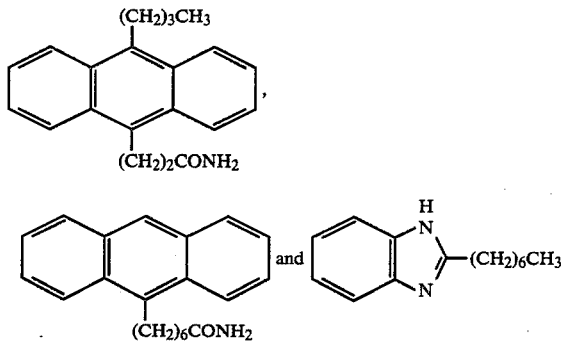

(at a ratio of 50 mol:50 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above three compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the first layer on the third layer formed before. This electrode plate was pulled out of the aqueous phase, and allowed to stand for more than 30 minutes at room temperature for drying.

Next, the electrode plate was placed again on a predetermined position in the vapor-deposition chamber of the resistance heating vapor-deposition apparatus, and carbazole (m.p. 245° C.) was put into one of the resistance heating boats while anthraquinone (m.p. 216° C.) was put into another resistance heating boat. After the inner pressure of the chamber was reduced to $10^{-6}$ Torr, the electric current running through the boat holding anthraquinone was maintained at a given constant value so that the deposition rate of anthraquinone could be approximately 0.1 Å/sec, while the electric current running through the boat holding carbazole was regulated so that the total deposition rate of carbazole and anthraquinone could be 2 Å/sec, and thereby a vapor-deposited film of 200 Å thick consisting of a mixture of carbazole and anthraquinone was formed as the second layer on the first layer formed before as the insulating layer. The pressure in the chamber was adjusted to $9 \times 10^{-6}$ Torr, and the temperature of the substrate holder to 20° C.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 2000 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 19.8 fL at a current density of 0.09 mA/cm².

Example 1m

An ITO layer of a film thickness of 1500 Å was formed on a glass surface of 50 mm square according to the sputtering method to afford a transparent electrode plate 44.

This electrode plate was placed on a predetermined position in the vapor-deposition chamber of the resistance heating vapor-deposition apparatus, and methyl stearate (m.p. 38° C.) was put into the resistance heating boat. After the inner pressure of the chamber was reduced to $10^{-6}$ Torr, the electric current running through the resistance heating boat was regulated so that the vapor-deposition rate could be 2 Å/sec, and thereby a vapor-deposited layer consisting of a methyl stearate layer of 200 Å thick was formed as the third layer on the transparent electrode layer of said electrode plate. The pressure in the chamber was adjusted to $9 \times 10^{-6}$ Torr and the temperature of the substrate holder to 20° C. during vapor deposition.

Next, the electrode plate was left as it was on a predetermined position in the vapor-deposition chamber of the resistance heating vapor-deposition apparatus, and anthracene (m.p. 216° C.) was put into one of the resistance heating boats while indazole (m.p. 145° C.) was put into another resistance heating boat. After the inner pressure of the chamber was reduced to $10^{-6}$ Torr, electric current running through the boat holding indazole was maintained at a given constant value so that the deposition rate of indazole could be approximately 0.1 Å/sec, while the electric current running through the boat holding anthracene was regulated so that the total deposition rate of anthracene and indazole could be 2 Å/sec, and thereby a vapor-deposited film of 200 Å thick consisting of a mixture of anthracene an indazole was formed as the first layer on the third layer formed before as the insulating layer. The pressure in the chamber was adjusted to $9 \times 10^{-6}$ Torr, and the temperature of the substrate holder to 20° C.

This electrode plate was immersed in an aqueous phase in Langmuir-Trough 4 (tradename, manufactured by Joyce-Loebel Co., Ltd.) where $4 \times 10^{-4}$ mol/l of CaCl$_2$ was contained in the aqueous phase to adjust its pH to 6.5.

Furthermore, a solution (0.5 ml) of

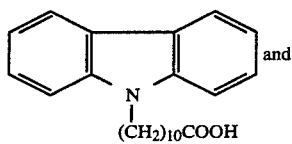

and

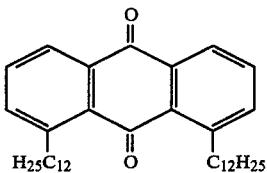

(at a ratio of 100 mol:1 mol and a total concentration of $1 \times 10^{-3}$ mol/l) in chloroform was spread on the aqueous phase. Then, with the surface pressure being adjusted to 30 dyne/cm, a multicomponent monomolecular film consisting of molecules of the above two compounds was formed. Then, the electrode plate was gently reciprocated twice in the up and down direction across the surface of the aqueous phase at a rate of 2 cm/min, and thereby a monomolecular-layer built-up film in which four monomolecular films of the above compounds were accumulated was formed as the second layer on the first layer formed before. This electrode plate was pulled out of the aqueous phase, and allowed to stand for more than 30 minutes at room temperature for drying.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 1600 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 24.0 fL at a current density of 0.10 mA/cm$^2$.

Example 1n

An ITO layer of a film thickness of 1500 Å was formed on a glass surface of 50 mm square according to the sputtering method to afford a transparent electrode plate 44. This electrode plate was immersed in an aqueous phase in Langmuir-Trough 4 (tradename, manufactured by Joyce-Loebel Co., Ltd.) where $4 \times 10^{-4}$ mol/l of CaCl$_2$ was contained in the aqueous phase to adjust its pH to 6.5.

Subsequently, a solution (0.5 ml) of stearic acid ($1 \times 10^{-3}$ mol/l) in chloroform was spread on the aforesaid aqueous phase. After removal of chloroform from the surface of the aqueous phase by evaporation, the surface pressure of the aqueous phase was adjusted to 30 dyne/cm, and a film of stearic acid was formed thereon.

Then, with the surface pressure being kept constant, the electrode was gently moved upwardly across the surface at a rate of 2 cm/min, and thereby a monomolecular film consisting of molecules of stearic acid was formed on the electrode layer of said electrode plate. It was pulled out of the aqueous phase and allowed to stand for more than 30 minutes at room temperature for drying. The above procedure was repeated twice more, and thereby a monomolecular-layer built-up film in which three monomolecular films consisting of molecules of stearic acid were accumulated was formed as the third layer on the electrode layer of said electrode plate. Stearic acid left on the surface of the aqueous phase was completely removed therefrom.

Next, the electrode plate was placed on a predetermined position in the vapor-deposition chamber of the resistance heating vapor-deposition apparatus, and anthracene (m.p. 216° C.) was put into one of the resistance heating boats while indazole (m.p. 145° C.) was put into another resistance heating boat. After the inner pressure of the chamber was reduced to $10^{-6}$ Torr, the electric current running through the boat holding indazole was maintained at a given constant value so that the deposition rate of indazole could be approximately 0.1 Å/sec, while the electric current running through the boat holding anthracene was regulated so that the total deposition rate of anthracene and indazole could be 2 Å/sec, and thereby a vapor-deposited film of 200 Å thick consisting of a mixture of anthracene and indazole was formed as the first layer on the third layer formed before as the insulating layer. The pressure in the chamber was adjusted to $9 \times 10^{-6}$ Torr, and the temperature of the substrate holder to 20° C.

Next, the electrode plate was left as it was on a predetermined position in the vapor-deposition chamber of the resistance heating vapor-deposition apparatus, and 2,5-diphenyloxazole was put into one of the resistance heating boats while anthraquinone was put into another resistance heating boat. After the inner pressure of the chamber was reduced to $10^{-6}$ Torr, the electric current running through the boat holding anthraquinone was maintained at a given constant value so that the deposition rate of anthraquinone could be approximately 0.1 Å/sec, while the electric current running through the boat holding 2,5-diphenyloxazole was regulated so that the total deposition rate of 2,5-diphenyloxazole and anthraquinone could be 2 Å/sec, and thereby a vapor-deposited film of 200 Å thick consisting of a mixture of 2,5-diphenyloxazole and anthraquinone was formed as the second layer on the first layer formed before as the insulating layer. The pressure in the chamber was adjusted to $9 \times 10^{-6}$ Torr, and the temperature of the substrate holder to 20° C.

Thereafter, the third layer in which two monomolecular films of stearic acid were accumulated was laid over the second layer according to the film-forming method as described before. The above procedure of forming the first to the third layer in one group was repeated four times to thereby obtain an integral luminescent layer (ca. 1900 Å thick) containing therein four interfaces between the first and the second layer of each group of lamination.

The electrode plate on which the luminescent layer was formed was placed in a vapor-deposition chamber. With the inner pressure of the chamber being at first reduced to $10^{-6}$ Torr and then adjusted to $10^{-5}$ Torr, an Al layer of 1500 Å thick was vapor-deposited on the third layer formed finally at a deposition rate of 20 Å/sec as a back electrode 45 to afford an EL device 40 of the present invention. After this EL device was sealed with sealing glass 41 as shown in FIG. 4, a silicone oil 42 which was purified, degasified and dried according to a usual method was introduced into the seal, and thereby an EL cell 43 was formed.

To the electrode 44 and 45 of this EL cell was applied an A.C. voltage of 20 V, 400 Hz to emit light, and the luminance and the current density was measured. The luminance was 34 fL at a current density of 0.13 mA/cm².

TABLE 1a

|  | Number of interfaces | Driving voltage | Luminance (fL) | Current density (mA/cm²) |
| --- | --- | --- | --- | --- |
| Example 1a | 5 | 5 V, 400 Hz | 21 | 0.11 |
| Example 2a | 7 | 10 V, 400 Hz | 30 | 0.10 |
| Example 3a | 9 | 10 V, 400 Hz | 31 | 0.11 |
| Example 4a | 15 | 15 V, 400 Hz | 36 | 0.12 |
| Example 5a | 4 | 10 V, 400 Hz | 28 | 0.08 |

TABLE 1h

|  | Number of interfaces | Driving voltage | Luminance (fL) | Current density (mA/cm²) |
| --- | --- | --- | --- | --- |
| Example 1h | 5 | 5 V, 400 Hz | 15 | 0.12 |
| Example 2h | 7 | 10 V, 400 Hz | 23 | 0.10 |
| Example 3h | 9 | 10 V, 400 Hz | 32 | 0.10 |
| Example 4h | 15 | 10 V, 400 Hz | 28 | 0.08 |
| Example 5h | 4 | 10 V, 400 Hz | 24 | 0.09 |

What we claim is:

1. An electroluminescent device which comprises a luminescent layer and a pair of electrodes, said luminescent layer comprising a first layer comprising a relatively electron-acceptable organic compound and a compound capable of being an electron-donor to said electron-acceptable organic compound, a second layer comprising a relatively electron-donative organic compound and a compound capable of being an electron-acceptor to said electron-donative organic compound, and a third layer having electrical insulating property, said three layers being repeatedly accumulated at least twice, and at least one of the three layers being formed of a Langmuir-Blodgett monomolecular film or a Langmuir-Blodgett monomolecular layer built-up film.

2. An electroluminescent device according to claim 1, wherein at least one of the pair of electrodes is transparent.

3. An electroluminescent device according to claim 1, wherein said electron-acceptable organic compound has a high luminescent quantum efficiency and $\pi$ electron system susceptible to external perturbation and can readily be excited by electric field.

4. An electroluminescent device according to claim 1, wherein said electron-acceptable organic compound is selected from fused polycyclic aromatic hydrocarbons, p-terphenyl, 2,5-diphenyloxazole, 1,4-bis(2-methylstyryl)-benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

5. An electroluminescent device according to claim 1, wherein said third layer is comprised of a compound selected from compounds represented by the following formulae A and B;

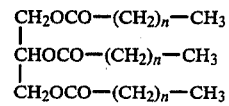

(wherein n is $10 \leq n \leq 30$, and X is a group of —COOH, —CONH₂, —COOR, —N⁺(CH₃)₃.Cl⁻,

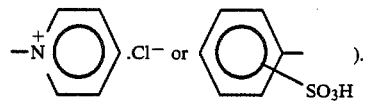

6. An electroluminescent device according to claim 1, wherein a content of the electron-donor in said first layer is 10 mol % to 0.1 mol % to the electron-acceptable organic compound.

7. An electroluminescent device according to claim 1, wherein a content of the electron-acceptor in said second layer is 10 mol % to 0.1 mol % to the electron-donative organic compound.

8. An electroluminescent device according to claim 1, wherein said first layer has a thickness of 300 Å or less.

9. An electroluminescent device according to claim 1, wherein said second layer has a thickness of 300 Å or less.

10. An electroluminescent device according to claim 1, wherein said third layer has a thickness of 300 Å or less.

11. An electroluminescent device according to claim 1, wherein said whole luminescent layer has a thickness of 1 μm or less.

12. An electroluminescent device according to claim 1, wherein said electrodes have a thickness of 0.01 to 0.3 μm.

13. An electroluminescent device according to claim 1, wherein said electron-donative organic compound has a high luminescent quantum efficiency and $\pi$ electron system susceptible to external perturbation and can readily be excited by electric field.

14. An electroluminescent device according to claim 1, wherein said electron-donative organic compound is selected from fused polycyclic aromatic hydrocarbons, p-terphenyl, 2,5-diphenyloxazole, 1,4-bis (2-methylstyryl)benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

15. An electroluminescent device which comprises a luminescent layer and a pair of electrodes, said luminescent layer comprising a first layer comprising a relatively electron-acceptable organic compound and a compound capable of being an electro-donor to said electron-acceptable organic compound, a second layer comprising a relatively electron-donative organic compound and a compound capable of being an electron-acceptor to said electron-donative organic compound, and a third layer having electrical insulating property, said three layers being successively overlaid in the direction of from one electrode to the other electrode on another third layer, said three layers being accumulated at least twice, and at least one of the three layers being formed of a Langmuir-Blodgett monomolecular film or a Langmuir-Blodgett monomolecular layer built-up film.

16. An electroluminescent device according to claim 15, wherein at least one of the pair of electrodes is transparent.

17. An electroluminescent device according to claim 15, wherein said electron-acceptable organic compound has a high luminescent quantum efficiency and $\pi$ electron system susceptible to external perturbation and can readily be excited by electric field.

18. An electroluminescent device according to claim 15, wherein said electron-acceptable organic compound is selected from fused polycyclic aromatic hydrocarbons, p-terphenyl, 2,5-diphenyloxazole, 1,4-bis(2-methyl-styryl)-benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

19. An electroluminescent device according to claim 15, wherein said third layer is comprised of compound selected from compounds represented by the following formulae A and B;

$$CH_3-(CH_2)_n-X, \text{ and} \qquad A$$

$$\begin{array}{l} CH_2OCO-(CH_2)_n-CH_3 \\ | \\ CHOCO-(CH_2)_n-CH_3 \\ | \\ CH_2OCO-(CH_2)_n-CH_3 \end{array} \qquad B$$

(wherein n is $10 \leq n \leq 30$, and X is a group of —COOH, —COHN$_2$, —COOR, —N$^+$(CH$_3$)$_3$.cl$^-$,

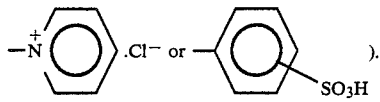

20. An electroluminescent device according to claim 15, wherein a content of the electron-donor in said first layer is 10 mol % to 0.1 mol % to the electron-acceptable organic compound.

21. An electroluminescent device according to claim 15, wherein a content of the electron-acceptor in said second layer is 10 mol % to 0.1 mol % to the electron-donative organic compound.

22. An electroluminescent device according to claim 15, wherein said first layer has a thickness of 300 Å or less.

23. An electroluminescent device according to claim 15, wherein said second layer has a thickness of 300 Å or less.

24. An electroluminescent device according to claim 15, wherein said third layer has a thickness of 300 Å or less.

25. An electroluminescent device according to claim 15, wherein said whole luminescent layer has a thickness of 1 μm or less.

26. An electroluminescent device according to claim 15, wherein said electrodes have a thickness of 0.01 to 0.3 μm.

27. An electroluminescent device according to claim 15, wherein said electron-donative organic compound has a high luminescent quantum efficiency and $\pi$ electron system susceptible to external perturbation and can readily be excited by electric field.

28. An electroluminescent device according to claim 15, wherein said electron-donative organic compound is selected from fused polycyclic aromatic hydrocarbons, p-terphenyl, 2,5-diphenyloxazole, 1,4-bis (2-methylstyryl)benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

29. An electroluminescent device which comprises a luminescent layer and a pair of electrodes, said luminescent layer comprising a first layer comprising a relatively electron-acceptable organic compound and a compound capable of being an electron-acceptor to said electron-acceptable organic compound, a second layer comprising a relatively electron-donative organic compound and a compound capable of being an electron-donor to said electron-donative organic compound, and a third layer having electrical insulating property, said three layers being repeatedly accumulated at least twice, and at least one of the three layers being formed of a Langmuir-Blodgett monomolecular film or a Langmuir-Blodgett monomolecular layer built-up film.

30. An electroluminescent device according to claim 29, wherein at least one of the pair of electrodes is transparent.

31. An electroluminescent device according to claim 29, wherein said electron-acceptable organic compound has a high luminescent quantum efficiency and π electron system susceptible to external perturbation and can readily be excited by electric field.

32. An electroluminescent device according to claim 29, wherein said electron-acceptable organic compound is selected from fused polycyclic aromatic hydrocarbons, p-terphenyl, 2,5-diphenyloxazole, 1,4-bis(2-methyl-styryl)-benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds and furthermore, heterocyclic compounds other than those mentioned above, derivatives thereof, aromatic amines, aromatic polyamines, and compounds having a quinone structure.

33. An electroluminescent device according to claim 29, wherein said third layer is comprised of a compound selected from compounds represented by the following formulae A and B;

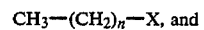

$$CH_3-(CH_2)_n-X, \text{ and} \qquad A$$

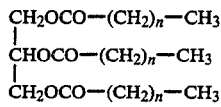

$$\begin{array}{l} CH_2OCO-(CH_2)_n-CH_3 \\ | \\ CHOCO-(CH_2)_n-CH_3 \\ | \\ CH_2OCO-(CH_2)_n-CH_3 \end{array} \qquad B$$

(wherein n is $10 \leq n \leq 30$, and X is a group of —COOH, —CONH$_2$, —COOR, —N$^+$(CH$_3$)$_3$.cl$^-$,

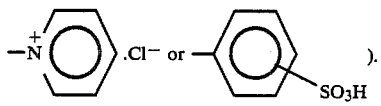

34. An electroluminescent device according to claim 29, wherein a content of the electron-acceptor in said first layer is 10 mol % to 0.1 mol % to the electron-acceptable organic compound.

35. An electroluminescent device according to claim 29, wherein a content of the electron-donor in said second layer is 10 mol % to 0.1 mol % to the electron-donative organic compound.

36. An electroluminescent device according to claim 29, wherein said first layer has a thickness of 300 Å or less.

37. An electroluminescent device according to claim 29, wherein said second layer has a thickness of 300 Å or less.

38. An electroluminescent device according to claim 29, wherein said third layer has a thickness of 300 Å or less.

39. An electroluminescent device according to claim 29, wherein said whole luminescent layer has a thickness of 1 μm or less.

40. An electroluminescent device according to claim 29, wherein said electrode has a thickness of 0.01 to 0.3 μm.

41. An electroluminescent device according to claim 29, wherein said electron-donative organic compound has a high luminescent quantum efficiency and π electron system susceptible to external perturbation and can readily be excited by electric field.

42. An electroluminescent device according to claim 29, wherein said electron-donative organic compound is selected from fused polycyclic aromatic hydrocarbons, p-terphenyl, 2,5-diphenyloxazole, 1,4-bis (2-methyl-styryl)benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

43. An electroluminescent device which comprises a luminescent layer and a pair of electrodes, said luminescent layer comprising a first layer comprising a relatively electron-acceptable organic compound and a compound capable of being an electron-acceptor to said electron-acceptable organic compound, a second layer comprising a relatively electron-donative organic compound and a compound capable of being an electron-donor to said electron-donative organic compound, and a third layer having electrical insulating property, said three layers being successively overlaid in the direction of from one electrode to the other electrode on another third layer, said three layers being accumulated at least twice, and at least one of the three layers being formed of a Langmuir-Blodgett monomolecular film or a Langmuir-Blodgett monomolecular layer built-up film.

44. An electroluminescent device according to claim 43, wherein at least one of the pair of electrodes is transparent.

45. An electroluminescent device according to claim 43, wherein said electron-acceptable organic compound has a high luminescent quantum efficiency and π electron system susceptible to external perturbation and can readily be excited by electric field.

46. An electroluminescent device according to claim 43, wherein said electron-acceptable organic compound is selected from fused polycyclic aromatic hydrocarbons, p-terphenyl, 2,5-diphenyloxazole, 1,4-bis(2-methyl-styryl)-benzene, xanthine, coumarin, acridine, cyanine dye, benzophenone, phthalocyanine and metal complexes thereof, porphrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

47. An electroluminescent device according to claim 43, wherein said third layer is comprised of a compound selected from compounds represented by the following formulae A and B;

$$CH_3-(CH_2)_n-X, \text{ and} \qquad A$$

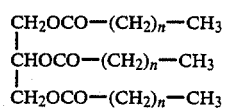

$$\begin{array}{l} CH_2OCO-(CH_2)_n-CH_3 \\ | \\ CHOCO-(CH_2)_n-CH_3 \\ | \\ CH_2OCO-(CH_2)_n-CH_3 \end{array} \qquad B$$

(wherein n is $10 \leq n \leq 30$, and X is a group of —COOH, —CONH$_2$, —COOR, —N$^+$(CH$_3$)$_3$.cl$^-$,

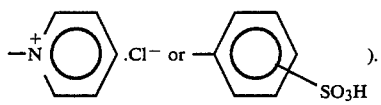

48. An electroluminescent device according to claim 43, wherein a content of the electron-acceptor in said first layer is 10 mol % to 0.1 mol % to the electron-acceptable organic compound.

49. An electroluminescent device according to claim 43 wherein a content of the electron donor in said second layer is 10 mol % to 0.1 mol % to the electron-donative organic compound.

50. An electroluminescent device according to claim 43, wherein said first layer has a thickness of 300 Å or less.

51. An electroluminescent device according to claim 43, wherein said second layer has a thickness of 300 Å or less.

52. An electroluminescent device according to claim 43, wherein said third layer has a thickness of 300 Å or less.

53. An electroluminescent device according to claim 43, wherein said whole luminecent layer has a thickness of 1 μm or less.

54. An electroluminescent device according to claim 43, wherein said electrode has a thickness of 0.01 to 0.3 μm.

55. An electroluminescent device according to claim 43, wherein said electron-donative organic compound has a high luminescent quantum efficiency and $\pi$ electron system susceptible to external perturbation and can readily be excited by electric field.

56. An electroluminescent device according to claim 43, wherein said electron-donative organic compound is selected from fused polycyclic aromatic hydrocarbons, p-terphenyl, 2,5-diphenyloxazole, 1,4-bis (2-methylstyryl)-benzene, xanthine, coumarin, acridine, cyanine dye, benzophenone, phthalocyanine and metal complexes thereof, porphyrin and metal complexes thereof, 8-hydroxyquinoline and metal complexes thereof, ruthenium complexes, rare earth complexes and derivatives of the above-mentioned compounds, and furthermore, heterocyclic compounds other than those mentioned above, derivatives thereof, aromatic amines, aromatic polyamines, and compounds having a quinone structure.

* * * * *

UNITED STATES PATENT AND TRADEMARK OFFICE
CERTIFICATE OF CORRECTION

PATENT NO. : 4,734,338
DATED : March 29, 1988
INVENTOR(S) : KEN EGUCHI, ET AL.

It is certified that error appears in the above-identified patent and that said Letters Patent is hereby corrected as shown below:

COLUMN 19

Formula 45, " 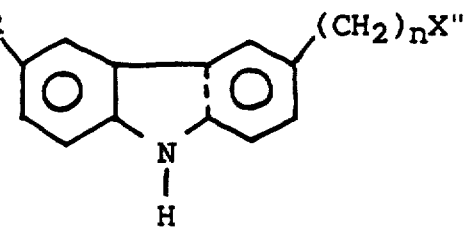 "

should read -- 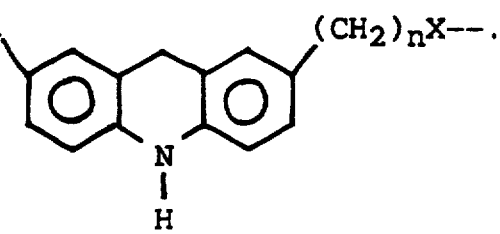 --.

COLUMN 20

Formula 48, "R  " should read --R  --.

COLUMN 21

Formula 49, " 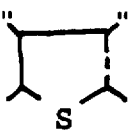 " should read -- 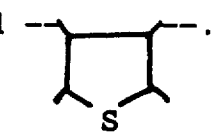 --.

UNITED STATES PATENT AND TRADEMARK OFFICE
CERTIFICATE OF CORRECTION

PATENT NO. : 4,734,338

DATED : March 29, 1988

INVENTOR(S) : KEN EGUCHI, ET AL.

It is certified that error appears in the above-identified patent and that said Letters Patent is hereby corrected as shown below:

COLUMN 26

Line 54, "$Cl^{-1}$," should read --$Cl^-$,--

COLUMN 27

Line 33, "$I_nO_2$, $S_nO_2$," should read --$InO_2$, $SnO_2$,--.

COLUMN 33

Line 47, "mil/l" should read --mol/l--.

COLUMN 38

Line 30, "mil/l" should read --mol/l--.

COLUMN 41

Line 49, "$mA/m^2$." should read --$mA/cm^2$.--.

COLUMN 52

Line 56, "$10^-$Torr," should read --$10^{-5}$Torr,--.

COLUMN 58

Line 23, "B;" should read --B:--.

UNITED STATES PATENT AND TRADEMARK OFFICE
CERTIFICATE OF CORRECTION

PATENT NO. : 4,734,338

DATED : March 29, 1988

INVENTOR(S) : KEN EGUCHI, ET AL.

It is certified that error appears in the above-identified patent and that said Letters Patent is hereby corrected as shown below:

COLUMN 59

Line 19, "electro-donor" should read --electron-donor--.
Line 58, "B;" should read --B:--.
Line 68, "-N+(CH$_3$)$_3$.cl-," should read ---N+(CH$_3$)$_3$.Cl-,--.

COLUMN 61

Line 20, "B;" should read --B:--.
Line 30, "-N+(CH$_3$)$_3$.cl-," should read ---N+(CH$_3$)$_3$.Cl-,--.
Line 59, "electrode has" should read --electrodes have--.

COLUMN 62

Line 45, "porphrin" should read --porphyrin--.
Line 57, "B;" should read --B:--.
Line 68, "-N+(CH$_3$)$_3$.cl-," should read ---N+(CH$_3$)$_3$.Cl-,--.

UNITED STATES PATENT AND TRADEMARK OFFICE
CERTIFICATE OF CORRECTION

PATENT NO. : 4,734,338                                Page 4 of 4

DATED : March 29, 1988

INVENTOR(S) : KEN EGUCHI, ET AL.

It is certified that error appears in the above-identified patent and that said Letters Patent is hereby corrected as shown below:

COLUMN 64

Line 2, "luminecent" should read --luminescent--.
Line 5, "electrode has" should read --electrodes have--.

Signed and Sealed this

Seventh Day of February, 1989

Attest:

DONALD J. QUIGG

Attesting Officer                    Commissioner of Patents and Trademarks